US008041509B2

(12) United States Patent
Alfano

(10) Patent No.: US 8,041,509 B2
(45) Date of Patent: Oct. 18, 2011

(54) SYSTEM AND METHOD OF ADDRESSING NONLINEAR RELATIVE MOTION FOR COLLISION PROBABILITY USING PARALLELEPIPEDS

(75) Inventor: Salvatore Alfano, Monument, CO (US)

(73) Assignee: Analytical Graphics, Inc., Exton, PA (US)

( * ) Notice: Subject to any disclaimer, the term of this patent is extended or adjusted under 35 U.S.C. 154(b) by 600 days.

(21) Appl. No.: 12/194,169

(22) Filed: Aug. 19, 2008

(65) Prior Publication Data

US 2010/0049440 A1 Feb. 25, 2010

(51) Int. Cl.
*G08G 9/02* (2006.01)
*G01C 21/00* (2006.01)
*G06F 19/00* (2006.01)

(52) U.S. Cl. .......................... 701/301; 701/13; 340/961

(58) Field of Classification Search .................. 701/301, 701/302, 48, 10, 13, 14; 340/961, 963; 702/189
See application file for complete search history.

(56) References Cited

U.S. PATENT DOCUMENTS 4,782,450 A * 11/1988 Flax .............................. 701/301
5,442,556 A * 8/1995 Boyes et al. ....................... 701/9
5,636,123 A * 6/1997 Rich et al. ..................... 701/207
6,201,482 B1 * 3/2001 Schiefele et al. ............. 340/961

* cited by examiner

*Primary Examiner* — Tan Q Nguyen
(74) *Attorney, Agent, or Firm* — The Marbury Law Group, PLLC

(57) ABSTRACT

Collision probability analysis for spherical objects exhibiting linear relative motion is accomplished by combining covariances and physical object dimensions at the point of closest approach. The resulting covariance ellipsoid and hardbody are projected onto the plane perpendicular to relative velocity by assuming linear relative motion and constant positional uncertainty throughout the brief encounter. Collision potential is determined from the object footprint on the projected, two-dimensional, covariance ellipse. To accommodate nonlinear motion in accordance with the disclosed embodiments, the dimension associated with relative velocity is reintroduced by segmenting the collision tube volume into a plurality of mitered tube sections modeled as bundles of parallelepipeds in Mahalanobis space. Disclosed embodiments compute the probability of each parallelepiped as the combined object passes through the space, and sums. The method is not dependent on a specific motion propagator and is designed to handle any object shape by using pixel files of the object images.

31 Claims, 15 Drawing Sheets

SYSTEM AND METHOD OF ADDRESSING NONLINEAR RELATIVE MOTION FOR COLLISION PROBABILITY USING PARALLELEPIPEDS

BACKGROUND

The disclosed embodiments relate to the field of collision prediction and avoidance of airborne and spaceborne vehicles. More particularly, the embodiments relate to flight path trajectory conflict prediction and maneuvering avoidance methods for airplanes and spacecraft using parallelepipeds in Mahalanobis space.

The following nomenclature is used herein:

axis12=unit vector from r1 to r2 axis12*r*=axis12 rotated axis23=unit vector from r2 to r3 axis23*r*=axis23 rotated

C3=3×3 positional covariance matrix dx=off-axis x position dy=off-axis y position dz=endpoint adjustment ECI=Earth centered inertial frame erf=error function m=counter upper limit $M_f$=final Mahalanobis distance $M_i$=initial Mahalanobis distance n=combined covariance ellipsoid scale factor OBJ=cross-sectional radius P=probability P_S1=Chan's analytical probability approximation r=radius of torus' cross-sectional (or relative distance vector)

r1=first relative distance point r2=second relative distance point r3=third relative distance point R=radius of torus (or Patera's distance to combined object center)

TCA=time of closest approach $t_i$=start time $t_f$=end time

V=swept out volume of collision tube

VNC=Velocity-Normal-Co-Normal frame

X=object's earth-centered x position y=object's earth-centered y position z=object's earth-centered z position α=coefficient defining probability density ϕ=object-centric angle in Mahalanobis space σ=standard deviation θ=object-centric angle The assumptions involved in linear collision probability formulation are generally well defined in the prior art. Object collision probability analysis (a.k.a., COLA) is typically conducted with the objects modeled as spheres, thus eliminating the need for attitude information. Their relative motion is considered linear for the encounter by assuming the effect of relative acceleration is dwarfed by that of the velocity. The positional errors are assumed to be zero-mean, Gaussian, uncorrelated, and constant for the encounter. The relative velocity at the point of closest approach is deemed sufficiently large to ensure a brief encounter time and static covariance. The cumulative collision probability P is found by integrating the three-dimensional, Gaussian, relative position density over the volume V (collision tube) that is swept out by the combined hardbody of the two space objects over a specified time interval $(t_i, t_f)$ $$P = \frac{1}{\sqrt{8\cdot\pi^3}\cdot\sigma_x\cdot\sigma_y\cdot\sigma_z}\cdot\iiint_{V(t_i,t_f)}\exp\left[\frac{-x^2}{2\cdot(\sigma_x)}+\frac{-y^2}{2\cdot(\sigma_y)}+\frac{-z^2}{2\cdot(\sigma_z)}\right]dx\,dy\,dz \quad (1)$$

The probability density in the bracketed section is conveniently represented in the diagonal frame of the position-error covariance matrix. The definition of the integration volume $V(t_i, t_f)$ is the most complicated aspect of evaluating Equation 1. Coupled with object sizes, the encounter region determines the limits of integration. The encounter region is defined when one object is within a standard deviation (σ) combined covariance ellipsoid shell scaled by a factor of n. This user-defined, three-dimensional, n-σ shell is centered on the primary object; n is typically in the range of 3 to 8 to accommodate conjunction possibilities ranging from 97.070911% to 99.999999%.

Because the covariances are expected to be uncorrelated, they are simply summed to form one, large, combined, covariance ellipsoid 10 that is centered at the primary object. The secondary object 12 passes quickly through this ellipsoid 10 creating a tube-shaped path that is commonly called a collision tube 14. A conjunction occurs if the secondary sphere touches the primary sphere, i.e., when the distance between the two projected object centers is less than the sum of their radii. The radius of this collision tube 14 accommodates all possibilities of the secondary touching the primary by combining the radii of both objects. A plane perpendicular to the relative velocity vector 16 is formed and the combined object and covariance ellipsoid are projected onto this encounter plane 18 as shown in FIG. 1.

As previously stated, the encounter region is defined by an n-σ shell determined by the user to sufficiently account for conjunction possibilities. For short-term encounters, the tube 14 is assumed straight and rapidly traversed, allowing a decoupling of the dimension associated with the tube path (relative velocity). The tube becomes a circle 22 on the projected encounter plane 18. Likewise, the covariance ellipsoid becomes an ellipse 24 as depicted in FIG. 2.

The relative velocity vector 16 (decoupled dimension) is associated with the time of closest approach (TCA). The conjunction assessment here is concerned with cumulative probability over the time it takes to span the n-σ shell, not an instantaneous probability at a specific time within the shell. Along this decoupled dimension, integration of the probability density across the shell produces a number very near unity, meaning the close approach will occur at some time within the shell with near absolute certainty. Thus the cumulative collision probability is reduced to a two-dimensional problem in the encounter plane 18 that is then multiplied by the decoupled dimension's probability. By rounding the latter probability to one, it is eliminated from further calculations. This projection results in a double integral.

The resulting two-dimensional probability equation in the encounter plane 18 is given as $$P = \frac{1}{2\cdot\pi\cdot\sigma x\cdot\sigma y}\cdot\int_{-OBJ}^{OBJ}\int_{-\sqrt{OBJ^2-(x)^2}}^{\sqrt{OBJ^2-(x)^2}}\exp\left[\left(\frac{-1}{2}\right)\cdot\left[\left(\frac{x+xm}{\sigma x}\right)^2+\left(\frac{y+ym}{\sigma y}\right)^2\right]\right]dy\,dx \quad (2)$$

where OBJ is the combined object radius, x lies along the minor axis, y lies along the major axis, xm and ym are the respective components of the projected miss distance, and σx and σy are the corresponding standard deviations. The four methods discussed below approximate Equation 2 numerically (Foster, Patera, Alfano) or analytically (Chan).

Foster (see Foster, J. L., and Estes, H. S., "A Parametric Analysis of Orbital Debris Collision Probability and Maneuver Rate for Space Vehicles," NASA/JSC-25898, August 1992) derived a collision probability model using polar coordinates in the encounter (U-W) plane where $R_0$ and φ define the combined object center's location, OBJ is the combined object radius, σu and σw are the principal axes standard deviations, and r and θ define the relative spatial position of the segmented object.

$$P = \frac{1}{2\cdot\pi\cdot\sigma u\cdot\sigma w}\cdot\int_0^{OBJ}\left[\int_0^{2\cdot\pi}\exp\left[\frac{-1}{2}\cdot\left[\left(\frac{R_0\cdot\sin(\phi)-r\cdot\sin(\theta)}{\sigma u}\right)^2+\left(\frac{R_0\cdot\cos(\phi)-r\cdot\cos(\theta)}{\sigma w}\right)^2\right]\right]\cdot r\,d\theta\right]dr \tag{3}$$

In Foster's numerical implementation, the angle θ step size is 0.5° and the radius r step size is OBJ/12. This model is currently used by NASA to assess on-orbit risk for ISS and Shuttle missions. It can also be found in The Aerospace Corporation's Collision Vision Tool. Solution accuracy is degraded when the object radius is smaller than the miss distance but larger than the standard deviation of the minor axis. Within the accuracy bounds of currently available orbital data, it is reasonable to assume that these theoretical cases are highly unlikely.

Patera (see Patera, R. P. "General Method for Calculating Satellite Collision Probability," Journal of Guidance, Control, and Dynamics, Vol. 24, No. 4, July-August 2001, pp. 716-722) developed a mathematically equivalent model to Equation 2 as a one-dimensional line integral where r is the distance to the hardbody perimeter and θ is the covariance-centric angular position. The probability density is symmetrized enabling the two-dimensional integral to be reduced to a one-dimensional path integral, resulting in the expression $$P = \frac{-1}{2\cdot\pi}\cdot\oint_{ellipse}\exp(-\alpha\cdot r^2)d\theta \tag{4a}$$

if the miss distance exceeds the combined object radius and $$P = 1-\frac{1}{2\cdot\pi}\cdot\oint_{ellipse}\exp(-\alpha\cdot r^2)d\theta \tag{4b}$$

if the combined object radius exceeds the miss distance. Computation of the α term and Equation 4's numerical implementation involves coordinate rotation, scaling, and trigonometric functions. In a subsequent Engineering Note (see Patera, R. P. "Calculating Collision Probability for Arbitrary Space-Vehicle Shapes via Numerical Quadrature," *Journal of Guidance, Control, and Dynamics*, Vol. 28, No. 6, November-December 2005, pp. 1326-1328), Patera switched the integration variable to be object-centric and employed a series expansion when r was very small. These changes overcame occasional computational difficulties of the original method and also resulted in substantially fewer iterations to achieve a given level of accuracy. This method is currently employed in The Aerospace Corporation's Collision Vision Tool.

The present inventor Alfano (see Alfano, S. "A Numerical Implementation of Spherical Object Collision Probability," *Journal of the Astronautical Sciences*, Vol. 53, No. 1, January-March 2005, pp. 103-109) developed a series expression to represent Equation 2 as a combination of error (erf) functions and exponential terms. In the encounter plane 18, the combined object center's location is (xm, ym) with associated standard deviations σx and σy and combined object radius OBJ. The series expression is given as $$P = \frac{OBJ\cdot 2}{\sqrt{8\cdot\pi}\cdot\sigma x\cdot n}\cdot\sum_{i=0}^{n}\left[\begin{array}{l}\operatorname{erf}\left[\dfrac{\left[ym+\dfrac{2\cdot OBJ}{n}\cdot\sqrt{(n-i)\cdot i}\right]}{(\sigma y\cdot\sqrt{2})}\right]+\\ \operatorname{erf}\left[\dfrac{\left[-ym+\dfrac{2\cdot OBJ}{n}\cdot\sqrt{(n-i)\cdot i}\right]}{(\sigma y\cdot\sqrt{2})}\right]\end{array}\right]\cdot\exp\left[\dfrac{-\left[\dfrac{OBJ\cdot(2\cdot i-n)}{n}+xm\right]}{2\cdot\sigma x^2}\right] \tag{5a}$$

The method then breaks the series into m-even and m-odd components and makes use of Simpson's one-third rule. An expression to determine a sufficiently small number of terms is given as $$m-\operatorname{int}\left(\frac{5\cdot OBJ}{\min\left(\sigma x,\ \sigma y,\ \sqrt{xm^2+ym^2}\right)}\right) \tag{5b}$$

with a lower bound of 10 and upper bound of 50. This method is currently implemented in Satellite Tool Kit (STK®) from Analytical Graphics, Inc. of Exton, Pa.

Chan (see Chan, K., "Improved Analytical Expressions for Computing Spacecraft Collision Probabilities," AAS Paper No. 03-184, AAS/AIAA Space Flight Mechanics Meeting, Ponce, Puerto Rico, 9-13 Feb. 2003) developed a series expression as an analytical approximation to Equation 2. It is based on transforming the two-dimensional Gaussian probability density function (PDF) to a one-dimensional Rician PDF and using the concept of equivalent areas. In the encounter plane, the combined object radius is OBJ, centered at (xm, ym) with associated standard deviations of (σx, σy). The series expression is $$P = \exp\left(\frac{-v}{2}\right)\cdot\sum_{m=0}^{\infty}\left[\frac{v^m}{2^m\cdot m!}\cdot\left(1-\exp\left(\frac{-u}{2}\right)\cdot\sum_{k=0}^{m}\frac{u^k}{2^k\cdot k!}\right)\right] \tag{6a}$$

where $$u = \frac{OBJ^2}{\sigma x\cdot\sigma y}\quad v = \frac{xm^2}{\sigma x^2}+\frac{ym^2}{\sigma y^2} \tag{6b \& 6c}$$

This expression has the added benefit of being easily differentiated for other types of probability analysis. This model is currently implemented in the Satellite Tool Kit from Analytical Graphics, Inc. Solution accuracy is degraded when the object radius is larger than one-tenth the miss distance. This is expected because Chan used an equivalent-area approximation.

However, the assumption of linear relative motion may not be valid in all cases. Chan (see Chan, K., "Spacecraft Collision Probability for Long-Term Encounters," AAS Paper No. 03-549, AAS/AIAA Astrodynamics Specialist Conference, Big Sky, Mont., 3-7 August, 2003), Patera (see Patera, R. P. "Satellite Collision Probability for Nonlinear Relative Motion," *Journal of Guidance, Control, and Dynamics*, Vol. 26, No. 5, 2003, pp. 728-733), Alfano (see Alfano, S., "Addressing Nonlinear Relative Motion For Spacecraft Collision Probability," AIAA Paper No. 2006-6760, 15$^{th}$ AAS/AIAA Astrodynamics Specialist Conference, Keystone, Colo., Aug. 21-24, 2006), and McKinley (see McKinley, D. P., "Development of a Nonlinear Probability Collision Tool for the Earth Observing System," AIAA Paper No. 2006-6295, 15$^{th}$ AAS/AIAA Astrodynamics Specialist Conference, Keystone, Colo., Aug. 21-24, 2006) each proposed different methods for calculating collision probability for such instances. Nonlinear motion is typically associated with long-term encounters, which imply the covariance can no longer be assumed static. The collision tube will not be straight, invalidating the simple dimensional reduction used for linear motion. The size of the n-σ shell must also be carefully considered, especially if the relative motion reverses direction during the encounter. The cumulative collision probability P is found by integrating the three-dimensional, Gaussian, relative position density over the volume V (collision tube) that is swept out by the combined hardbody of the two space objects over a specified time interval ($t_i$, $t_f$)

$$P = \frac{1}{\sqrt{8\cdot\pi^3}\cdot\sigma_x\cdot\sigma_y\cdot\sigma_z}\iiint_{V(t_i,t_f)} \exp\left[\frac{-x^2}{2\cdot(\sigma_x)^2} + \frac{-y^2}{2\cdot(\sigma_y)^2} + \frac{-z^2}{2\cdot(\sigma_z)^2}\right] dx\,dy\,dz \tag{7}$$

The probability density in the bracketed section is conveniently represented in the diagonal frame of the position-error covariance matrix. The definition of the integration volume $V(t_i, t_f)$ is the most complicated aspect of evaluating this expression.

The previously described linear methods for computing satellite collision probability can be extended to accommodate nonlinear relative motion in the presence of changing position and velocity uncertainties. For linear relative motion, the probability along the relative velocity vector (collision tube) is unity and is conveniently removed from the calculations. For nonlinear motion, that dimension must be reintroduced. This can be simply done by breaking the collision tube into small sections, computing the probability associated with each section, and then summing. To accomplish this, an (orbit) propagator is needed that can propagate object (satellite) position, velocity, and associated covariances. The propagator must be of sufficient accuracy to meet user requirements.

The general method of adjoining tubes begins with object position and velocity data at the time of closest approach. Propagation is done forward/backward in time until a user limit is reached. The limit can be based on a standard deviation threshold (3σ was mentioned by Patera and an upper limit of 8.5σ recommended by Chan) or a specified time (such as one half an orbital period). For each time step the tube sections should be sufficiently small enough so that, over the interval, the relative motion can be assumed linear and the covariance constant. For each section, a two-dimensional probability is computed as previously described for linear motion by projecting the combined object shape onto a plane perpendicular to the relative velocity. In addition, a one-dimensional probability is computed along the relative velocity vector by determining the component position from the mean at each end of the tube and then dividing by the standard deviation for that axis, thus producing each endpoint's Mahalanobis distance (see Alfano, S., "Addressing Nonlinear Relative Motion For Spacecraft Collision Probability," AIAA Paper No. 2006-6760, 15$^{th}$ AAS/AIAA Astrodynamics Specialist Conference, Keystone, Colo., Aug. 21-24, 2006). The product of these probabilities yields the sectional probability. All sectional probabilities are summed until the time and/or sigma limit is reached. This approach differs from Patera's original work in that the symmetrized space is time-invariant resulting in a new derivation of the path integral. The probability of each cylinder is determined by multiplying the two-dimensional linear probability by the sectional (relative velocity axis) probability; the user may choose any of the linear probability models previously described in the literature.

The tubes have no gaps when dealing with linear relative motion. For such cases, the nonlinear results will match the linear probability for constant covariance and spherical objects. As seen in FIG. 3, nonlinear motion causes gaps 32 and overlaps 34 where the tube sections 36 meet. If the relative motion track 38 bends towards the covariance ellipsoid center, then the overlapping sections 34 will occur in regions of greater probability density with the gaps 32 occurring in regions of lesser probability density. Although the gap and overlapping volumes are almost equal, the resulting summation causes an over inflation of the probability. If the relative motion track 38 bends away from the covariance ellipsoid center, then the probability for cylindrical tubes will be underestimated because the gap 32 is in a region of higher probability density. The amount of error will vary based on the degree of bending/overlap relative to probability density as well as the rate of covariance growth during the encounter time.

There are several choices the user should carefully consider when implementing this method. The limits and time step must be selected to ensure adequacy for the intended analysis. For a very large time limit and cyclical relative motion it is possible to retrace the same path through the covariance space. An example would be one satellite circling the other in formation for hundreds of revolutions. The collision tube would continually trace over itself; if care is not taken, the single revolution probability could be summed hundreds of times. To avoid this, it is suggested that the total time limit not exceed one half of an orbital period or that subsequent retracing be recognized and suitable adjustments made to the calculation. A large time step can also cause errors if the sectional motion is not sufficiently linear or the sectional covariance is not sufficiently constant. A simple test for sufficiency is to halve the time step and repeat the analysis. If the probability differences are within the user's tolerance, then the time step is adequate.

Three-dimensional position and velocity data of each object, as well as their 6×6 covariance matrices, are required. Although not necessary, this work assumes all starting data to be at the point of closest approach in the Earth Centered Inertial (ECI) frame. Suitable incremental limits should be set for the time step, maximum acceptable angle (angular limit) between adjoining tubes, and maximum change in long-axis sigma for any tube. Additionally, the user must specify the computational stopping condition in terms of time limit and/or encounter region.

To compute the sectional probability of each tube, all data is propagated for the given time step. If the angular difference between the previous and current relative velocity vectors exceeds the angular limit, the time step is halved and this process repeated. A coordinate transformation is accomplished to align the z axis with the relative velocity vector. The one-dimensional, z-axis, Mahalanobis distances of the cylinder endpoints ($M_i$, $M_f$) are used to compute long-axis probability $P_{1d}$ from $$P_{1d} = \left| \frac{1}{2} \cdot \left( \operatorname{erf}\left( \frac{M_f}{\sqrt{2}} \right) - \operatorname{erf}\left( \frac{M_i}{\sqrt{2}} \right) \right) \right| \tag{8}$$

If the endpoint differences should exceed the maximum change in long-axis sigma then the time step is halved and this process repeated. Projection of the collision tube onto the encounter plane, defined by the x-y axes, produces the necessary information to generate two-dimensional collision probability using whatever method the user chooses. The one- and two-dimensional probabilities are then multiplied to determine the sectional collision probability. This process is repeated until a final limit is reached.

A 3σ encounter shell may be insufficient for some cases where the relative trajectory reverses itself. Consider the linear and nonlinear motion shown in FIG. 4A. The nonlinear relative motion is such that the trajectory 42 exits and reenters the 3σ encounter shell 44 both before and after the close approach point. The positional history represented by the Mahalanobis distance 46 is plotted versus time in seconds in FIG. 4B. With a final calculation limit of 3σ, the nonlinear probability is 0.000747. Expanding the limit to 10σ, the nonlinear probability is 0.00111. In this case, the 3σ limit did not fully capture the encounter. As a point of reference, the linear probability is 0.000469.

Patera presented a nonlinear toroidal case for testing. A circular, relative trajectory 52 is chosen with a spherical hard-body radius and symmetric covariance ellipsoid. The object creates a torus 54 as it follows the circular trajectory 52. The exact solution to collision probability was derived by members of The Aerospace Corporation as:

$$p = \frac{2}{\sigma} \cdot \sqrt{\frac{2}{\pi}} \cdot \exp\left[ \frac{-(R^2 + r^2)}{2 \cdot \sigma^2} \right] \cdot \int_0^r \sinh\left( \frac{R \cdot \sqrt{r^2 - x^2}}{\sigma^2} \right) dx \tag{9}$$

where σ is the standard deviation, R is the radius of the torus, and r is the cross-sectional radius as shown in FIG. 5.

The collision tube is more closely represented as the number of cylinders increases. With σ set to one, R set to one, and r set to 0.3, Eq. 9 produces a probability of 0.066144. The number of adjoining cylinders was varied from 4 to 300 to assess convergence behavior as displayed in FIG. 6 with the label "Adjn Tubes". Representing the torrus with 300 adjoining cylinders, the probability value was 0.06765. This is an overestimate of 2.3% and is in agreement with Patera. Because the tube bends towards the origin, the cylinders will overlap in regions of greater probability density and cause an overestimation. The collision probability calculation does not require a large number of tubes. Even with an angle limit of 5 degrees, the probability is 0.06767, suggesting that the test for nonlinearity given by Chan may be relaxed in certain cases.

The gaps and overlaps created by adjoining right circular cylinders can be reduced by sectioning the cylinder into component pieces. The gaps and overlaps of all the sections will be considerably smaller than the unsectioned cylinder. For Foster's method, the cylinder is sectioned into 12 radial segments and 720 angular segments. Patera (see Patera, R. P., "Collision Probability for Larger Bodies Having Nonlinear Relative Motion," *Journal of Guidance Control and Dynamics*, Vol. 29, No. 6, November-December 2006, pp. 1468-1471) found that by using his methods, five radial segments and 20 angular segments are adequate for the cases he examined.

What would be useful is a non-polar form of sectioning that has the added benefit of easily representing any object shape.

BRIEF SUMMARY

In disclosed embodiments, the right cylinders described previously are instead modeled by bundles of abutting parallelepipeds. Each parallelepiped end is adjusted such that the bundle forms a compound miter where neighboring tubes meet, thereby reducing any gaps or overlaps. The approach that follows applies to all relative motion and is coupled with a modified error-function method to allow any object shape. As before, the method begins with object position, velocity, and covariance data at TCA. Propagation is done forward/backward in time until a user limit is reached. For each time step the tube sections are sufficiently small enough so that, over the interval, the relative motion can be assumed linear and the covariance constant. The probability of each parallelepiped is computed and summed to obtain the overall probability of the tube section. All sections are summed to produce the overall encounter probability.

DETAILED DESCRIPTION

Embodiments disclosed herein assist in flight path trajectory conflict prediction and maneuvering avoidance methods for airplanes and spacecraft by increasing accuracy through use of parallelepipeds to model the collision tube volume in Mahalanobis space.

General Method

Figure 7:
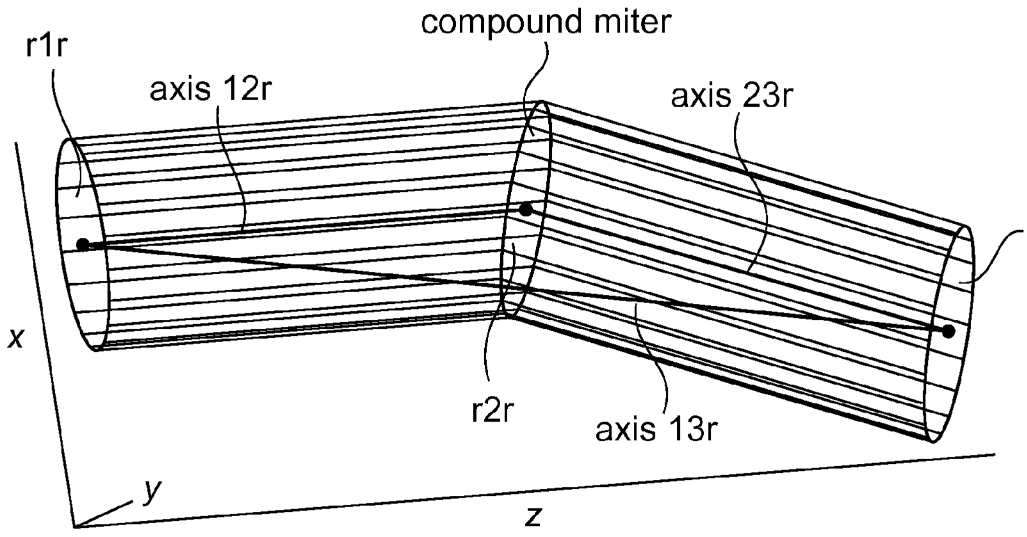
FIG. 7 illustrates a compound miter description of a collision tube volume.

In the general method, geometric projections determine the end points of each parallelepiped. Let r1, r2, and r3 be three consecutive points along the relative trajectory in the Velocity-Normal-Co-Normal (VNC) frame of the primary object. Determine the unit vectors from r1 to r2 (axis12 for the first tube) and r2 to r3 (axis23 for the second tube). Rotate the axes to a new frame (denoted by suffix r) where the z component is aligned with axis12 such that after rotation axis12*r* is (0 0 1) as shown in FIG. 7.

Define axis13*r* as the sum of axis12*r* and axis23*r*; the compound miter is perpendicular to axis13*r* and passes through r2*r*. In the new frame the r2*r* end point adjustment dz for each parallelepiped is found by examining the first tube's off-axis positions dx and dy through the equation $$dz = \frac{dx \cdot axis13r_x + dy \cdot axis13r_y}{-axis13r_z} \tag{10}$$

The use of trigonometric functions and their associated sign rectifications are not needed. The center of the parallelepiped's face is shifted from r2*r* by (dx dy dz), placing it on the surface of the compound miter.

Figure 8:
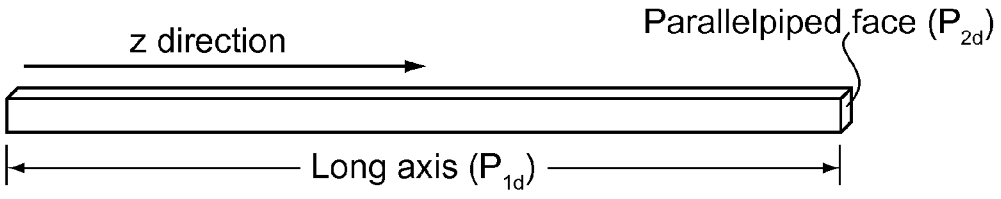
FIG. 8 illustrates a parallelepiped description used for modeling collision tube volume.

At every time step the two-dimensional probability $P_{2d}$ is computed by aligning the parallelepiped sides with the projected covariance axes (face in FIG. 8). This eliminates covariance cross-correlation terms so that Equation 8 can be used for each of the two axes individually and the results multiplied to produce $P_{2d}$. The parallelepiped ends, as adjusted by Equation 10, are transformed to the Mahalanobis space where Equation 8 is used to compute the long-axis probability $P_{1d}$. This modified error-function method is somewhat similar to the more time-consuming voxel method. In essence the voxels are no longer cubes with constant dimensions in Mahalanobis space; they are extended along the relative velocity vector to create parallelepipeds that can be resized and reoriented for each tube section.

With no motion there is no accumulation of probability. A key assumption of this method is that the parallelepiped bundles represent the motion of the combined object sphere through the space. Each bundle does not give the instantaneous collision probability for its span of time, but the accumulated sections will yield the probability over a sufficiently large probability density interval (spanning 8.5σ for 14 decimal place accuracy). If the relative motion is nonexistent or very small over the time interval, then the motion is considered insufficient. Theoretically this could occur for a secondary satellite directly ahead or behind the primary in the same two-body Keplerian orbit. For such a case; there is no relative motion and the bundles are not an accurate representation; it is suggested that the instantaneous probability of the sphere be used at whatever time the user chooses because there is no definitive TCA. Alternately one could choose the maximum instantaneous probability over a range of time or assess a sufficiently large number of Monte Carlo simulations.

Because of the approach taken to produce $P_{2d}$, this method can accommodate any complex object shape (convex, concave, spiral, hollow, etc.). Using the Area Tool in Satellite Tool Kit (STK© from Analytical Graphics, Inc. of Exton, Pa.) or a similar product, a pixel file can be created for each object as seen along the relative velocity vector. These pixel files are then merged to produce a combined file that maps out all points where the two objects could touch. Each pixel that contains a segment of the combined object becomes the face of another parallelepiped and is included in the calculation.

Sectional Computation

Three-dimensional position and velocity data of each object, as well as their 6×6 covariance matrices, are required with the assumption that all starting data are in the Earth Centered Inertial (ECI) frame then transformed to the primary object's VNC frame where the relative distance vector is computed. Suitable incremental limits should be set for each time step with the user specifying the computational stopping condition in terms of time limit and/or encounter region. The computational algorithm is as follows.

Initially propagate all to Time of Closest Approach (TCA) in Earth Centered Inertial (ECI) frame
- Convert starting data to VNC frame of primary object
- Assign original relative position in VNC frame to r2
- Determine relative position r1_ECI & covariance by propagating back one time step from TCA
- Convert propagated data to VNC frame of primary object
- Assign relative position in VNC frame to r2
- Determine relative position r3_ECI & covariance by propagating forward one time step from TCA
- Convert propagated data to VNC frame of primary object
- Assign relative position in VNC frame to r3

Begin iteration
- Propagate forward one time step from r3_ECI to determine relative position r4_ECI & covariance
- Convert propagated data to VNC frame of primary object
- Assign relative position in VNC frame to r4
- Create unit vector from r1 to r2, label it axis12
- Create unit vector from r2 to r3, label it axis23
- Create unit vector from r3 to r4, label it axis34
- Create vector from summation of axis 12 and axis 23, label it axis13
- Create vector from summation of axis23 and axis 34, label it axis24
- Compute necessary rotation matrix to align new z component with relative velocity (axis23) while simultaneously decoupling new x and y components with respect to projected covariance.
- Rotate r2, r3, axis23, axis13, axis24, and 3×3 positional covariance (C3) associated with r2 to new frame while denoting rotated data with an r suffix (r2*r*, r3*r*, axis23*r*, axis13*r*, axis24*r*, C3*r*)
- Compute necessary rotation/scaling matrix to go from new frame to Mahalanobis space where the z component is aligned with the relative velocity vector, label it T_maha
- Middle tube axis endpoints are r2*r* and r3*r*: [xm, ym, zm2]=r2*r* & [xm, ym, zm3]=r3*r*
  - Find z component of tube's central axis ends using T_maha transformation, label them zm_start & zm_end
- For each pixel of combined object
  - Determine its width, height, and off-axis central position (dx, dy)
  - Use r2*r*, axis13*r*, dx and dy to find dz2 to define one end of parallelepiped [xm+dx, ym+dy, zm2−dz2]

Find z component of parallelepiped end using T_maha transformation, label it z_start Use r3r, axis24r, dx and dy to find dz3 to define other end of parallepiped [xm+dx, ym+dy, zm3−dz3]

Find z component of parallelepiped end using T_maha transformation, label it z_end Find parallelepiped's 2D probability (face) centered at [xm+dx, ym+dy] using corresponding width and height Find parallelepiped's 1D probability (length) using z_start and z_end If sign(zm_end−zm_start) is opposite of sign(z_end−z_start) then there is overlap Negate parallelepiped's 1D probability Multiply 1D and 2D probabilities and add to running sum Reassign r2 to r1, r3 to r2, r4 to r3; do likewise for covariances Repeat until final limit reached (time, number of orbits, encounter shell limit, . . . )

This iterative procedure is done twice, once forward in time from TCA and once backward in time.

Practical Considerations

If the time step is too large, the parallelepipeds may not adequately represent the path of the combined objects through the changing probability density space. Also, fidelity increases with the number of parallelepipeds used to represent the combined object's shape for each tube section.

The incremental limits chosen for this method were the same as the adjoining tube method. In addition, one must specify how many parallelepipeds-per-bundle are needed to adequately represent the combined object space. The Number of 2-D Integration Steps defines this granularity for the two-dimensional probability computation and was set to 25.

The computation of parallelepipeds can be considerably longer than the adjoining tubes method. To compute a single cylindrical tube using a granularity value of 25 requires approximately 1963 parallelepipeds (π×25^2). This is necessary to reduce gaps and overlaps. For non-cylindrical shapes the number will vary, as explained later.

It is suggested that reverse reorientation be done to eliminate the need to associate the covariance ellipsoid axes from one time step to the next. As the covariance changes shape and orientation over time, it is possible that a minor axis in a previous iteration becomes a major axis in the next. It is not uncommon for eigenvalue solving routines to order their outputs from least to greatest or vice-versa. Without associating the axes from step to step, the corresponding eigenvalues could reorder the axes, thereby causing a sudden axis swap which would appear as an abrupt 90° reorientation in the transformed space. By using the same ordered eigenvectors to reverse the reorientation, any axis swap that might occur is undone.

Figure 9:
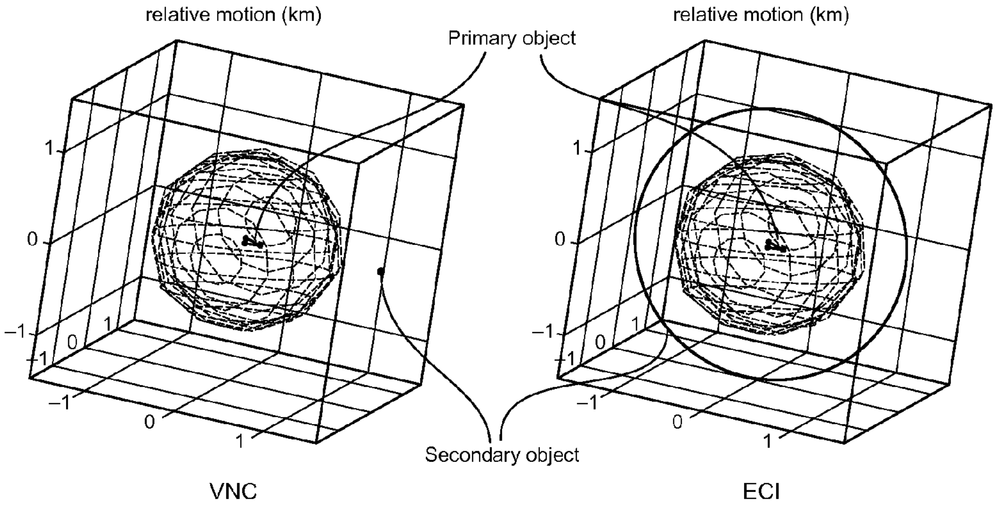
FIG. 9 illustrates apparent relative motion in Mahalanobis space in VNC (Velocity-Normal-Co-Normal) frame and ECI (Earth Centered Inertial) frame.

Another consideration is the choice of a rotating, rather than inertial frame. As seen in the FIG. 9, relative motion can appear quite different in different frames. Consider the case of a time-invariant, combined covariance that is represented by the identity matrix with a secondary object 1.5 kilometers ahead of the primary in otherwise identical circular orbits. In the VNC frame, the secondary object would appear as a static sphere. In Mahalanobis space the combined hardbody would also appear as a static sphere and affect very few voxels. In this case the cumulative probability would equal the instantaneous probability as only the original object volume is counted. In the ECI frame, the secondary object would appear to circle the primary object in the course of a single orbit and, on initial inspection, affect (sweep out) many voxels along this path. To accommodate the latter case, one must take care to rotate the Mahalanobis space with the orbit. For this work, the VNC frame was chosen for convenience as well as visualization.

Figure 10:
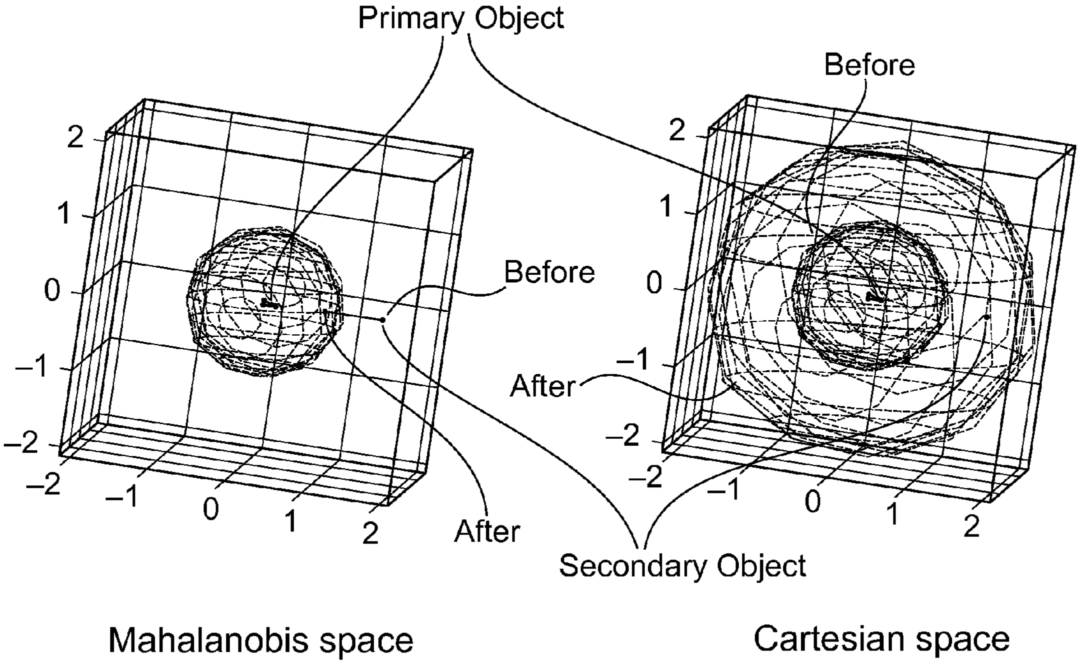
FIG. 10 illustrates apparent relative motion in Mahalanobis space and Cartesian space.

Due to time correlation, apparent motion in Cartesian space can be misleading when working in Mahalanobis space. When an object moves through a probability density space, there will be an accumulation of collision probability. Consider the theoretical case of a secondary object 1.5 kilometers ahead of the primary in otherwise identical circular orbits, but with a growing covariance, as depicted in FIG. 10. In Cartesian space the relative distance vector is fixed, but the time-varying covariance causes the ellipsoid to grow with time. Transforming this problem to a symmetrized space, where sigma is the same regardless of time, causes the object's relative distance to be continuously rescaled based on the changing eigenvalues of the changing covariance. So in this transformed space there is object motion with a static covariance resulting in an accumulation of probability. For this case, where there is no relative Cartesian motion, one could simply choose to use the instantaneous probability. There is, however, no definitive TCA. The time chosen will determine the covariance size which will affect the probability calculation.

Figure 11:
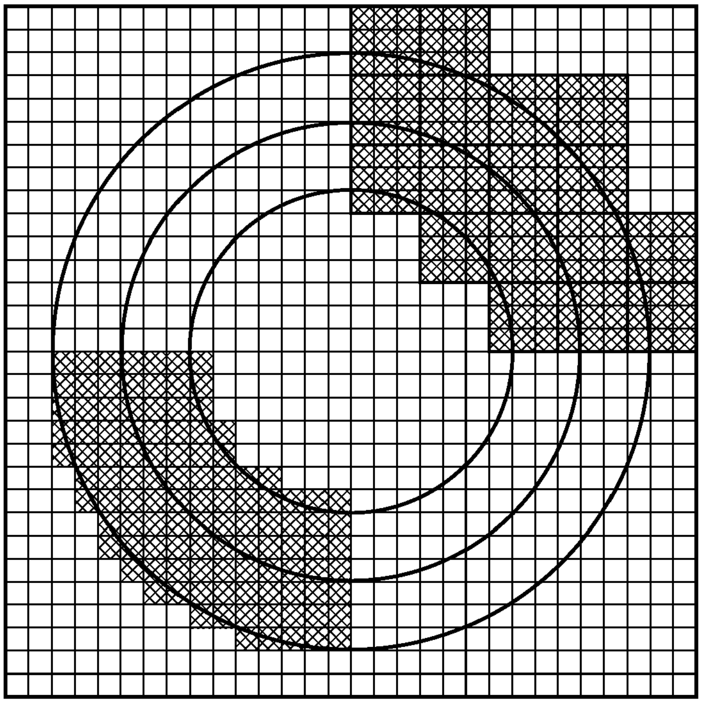
FIG. 11 illustrates a torus depiction wherein parallelepiped size affects object representation.

Obviously, if the number of parallelepipeds-per-bundle are small, the representation will encompass more volume than the hardbody. As the number increases so does fidelity, with the bundles becoming more representative of the combined object's shape, as seen in the torus of FIG. 11. For the torus, the upper-right faces of the parallelepiped depicted by heavy black lines significantly overestimate the object. The lower-left faces depicted with finer lines estimate the object more closely. Spherical objects can be severely distorted when transformed to the Mahalanobis space. The same transformation that makes an elongated covariance ellipsoid a unit sphere will cause a spherical hardbody to become an ellipsoid. The user should choose a resolution that is sufficiently fine to properly represent the object. One approach is to repeat the computations with twice the resolution. For this work, if the new results agree to within two significant figures of the old, the resolution and associated probability are considered suitable. If not, then the resolution is doubled and the process repeated until the desired number of significant figures is achieved.

Numerical Testing

A tool was scripted in MATLAB© for testing conjunctions of spherical objects. The tool uses data containing positions, velocities, object sizes, and 6×6 covariance matrices of both objects at TCA and requires the user to set the intermediate limits. Calculation continues until one of the limits defined by the final variables is reached. Those limits are End Time and End Sigma. The End Sigma is the final Mahalanobis distance and also the value of n for the n-σ shell.

Figure 1:
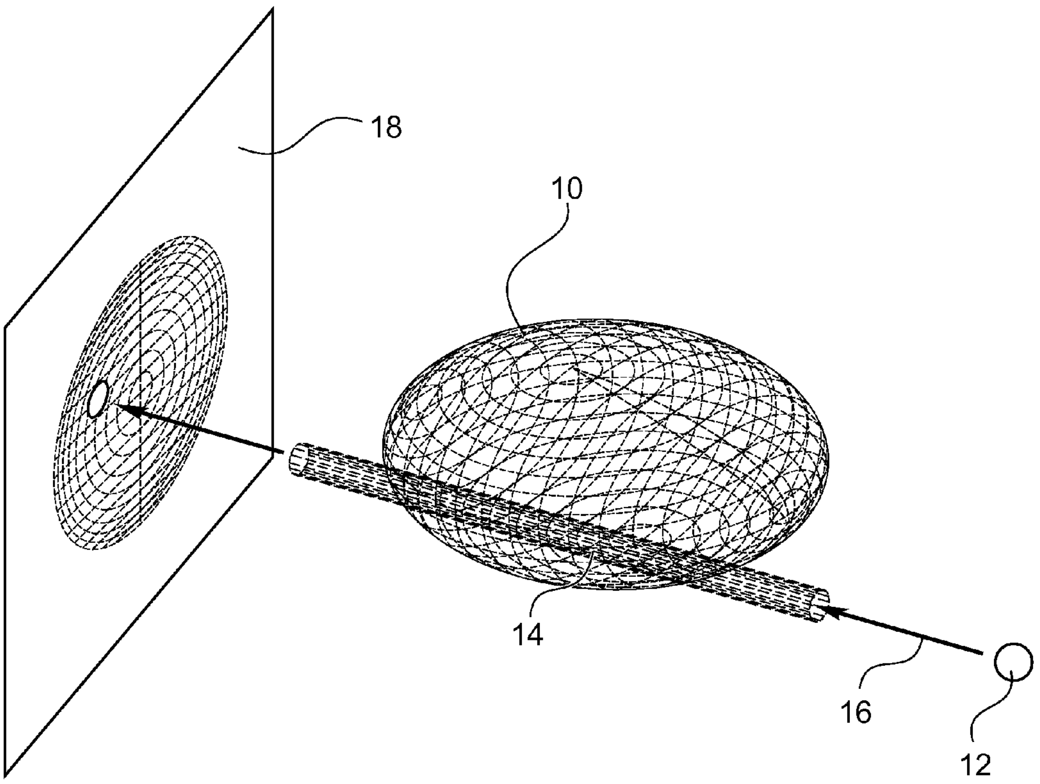
FIG. 1 (Prior Art)
FIG. 1 illustrates a conjunction encounter visualization and reduction in accordance with the prior art.
Figure 2:
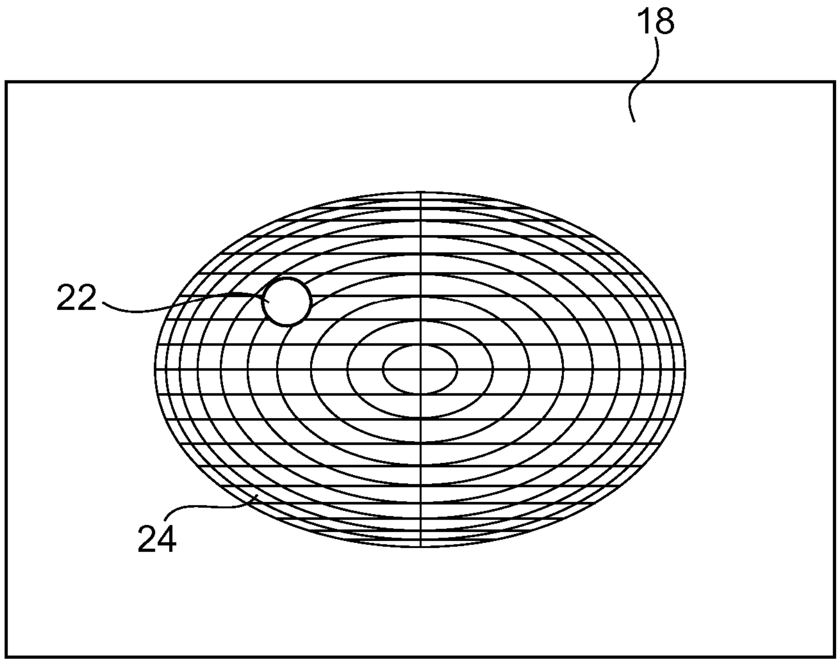
FIG. 2 (Prior Art)
FIG. 2 illustrates the projection onto the encounter plane of FIG. 1.
Figure 3:
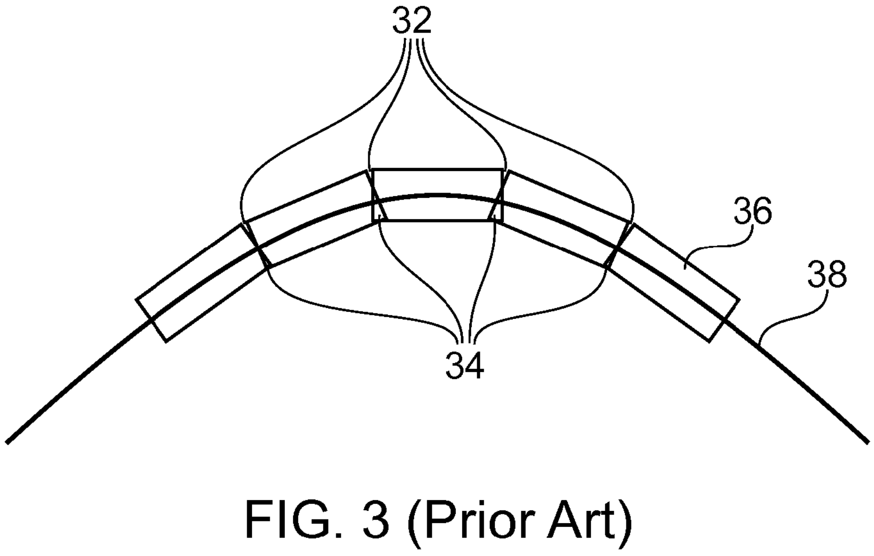
FIG. 3 (Prior Art)
FIG. 3 illustrates prior art tube sections for a nonlinear relative motion track.
Figure 4A:
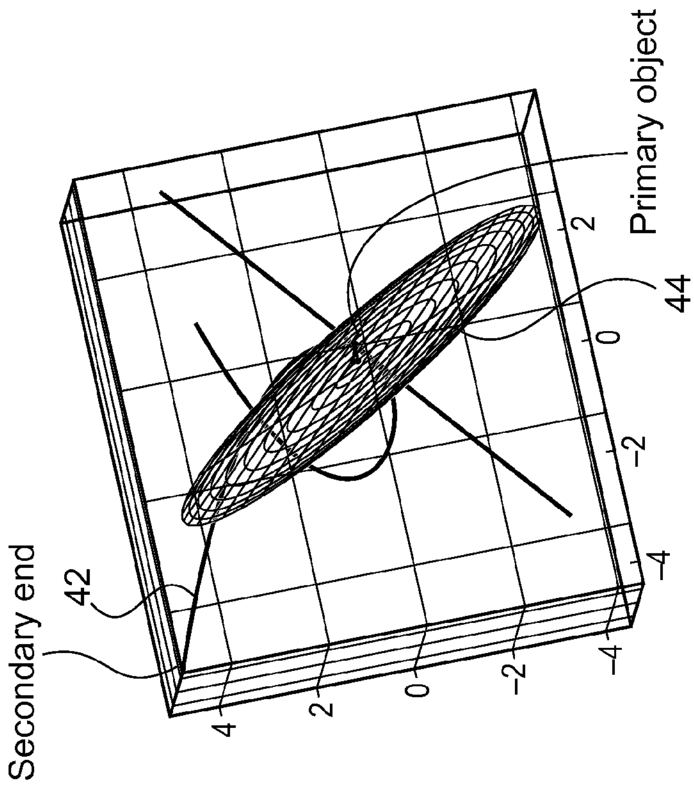
FIG. 4A illustrates nonlinear relative motion and FIG. 4B illustrates the resulting variation of Mahalanobis distance over time.
Figure 4B:
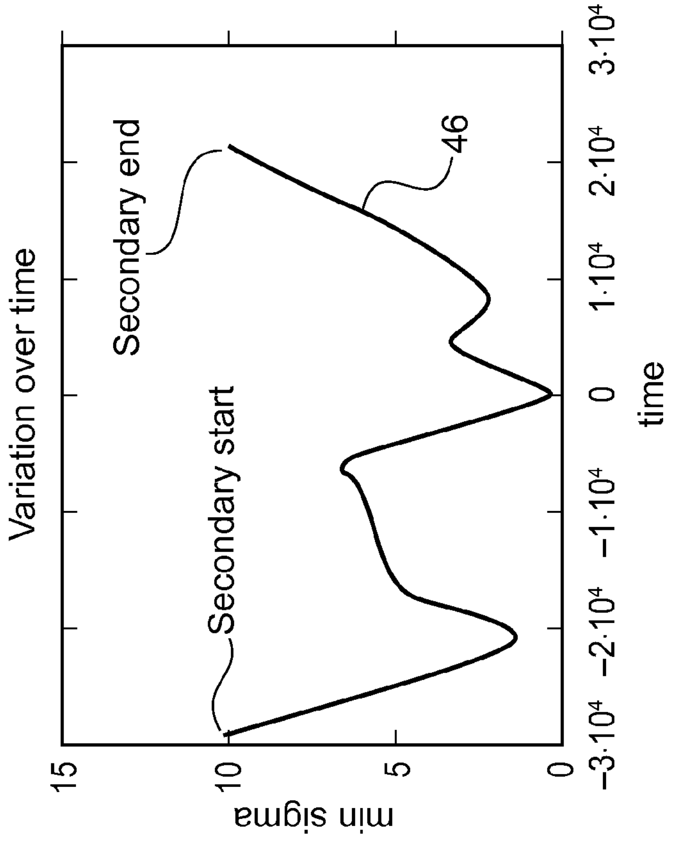
Figure 5:
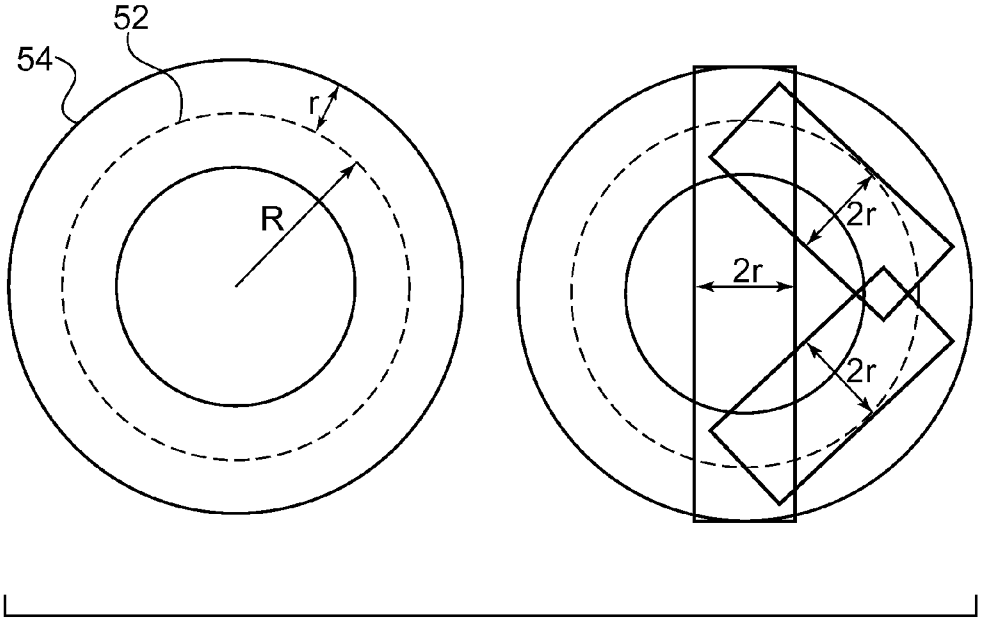
FIG. 5 illustrates a circular relative motion test case modeled as a torus and under-represented cylindrical representations.
Figure 6:
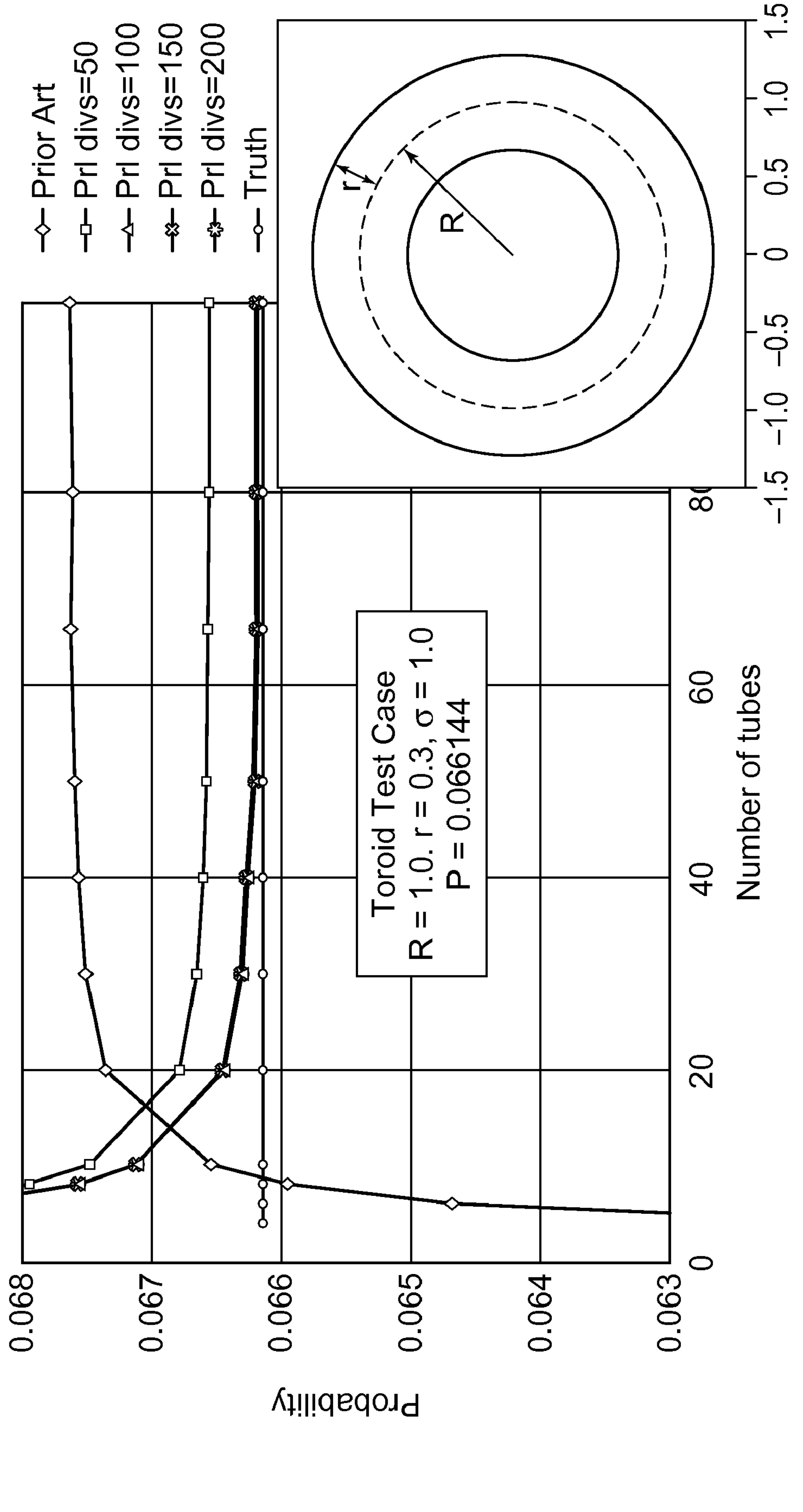
FIG. 6 illustrates convergence behavior for a torroidal test case and the results of various representations.

Initial testing was done by comparing the method to linear-motion cases and Patera's nonlinear cases. As expected, the methods matched the linear-motion cases. For the previously-mentioned toroidal case the number of adjoining cylinders was varied from 4 to 100 to assess convergence behavior as displayed in the FIG. 6 by the lines labeled "Prl divs." The torrus was represented with bundled parallelepipeds of varying granularity. Four such cases are displayed where the number of divisions per projected axis (face) were varied from 50 to 200 (radial divisions from 25 to 100); the latter produced a probability of 0.066178 (0.05% error) for 100 tubes. For comparison, the adjoining tubes results are shown on the same plot. Unlike the adjoining tubes method that uses right cylinders, increasing the number of tubes yields even greater accuracy, as does increasing the number of radial divisions.

Representing Exact Object Shapes

The abutting parallelepipeds lend themselves well to representing the exact, projected shape of the combined object in the encounter plane. Each parallelepiped face can be tailored to the individual size of a single pixel. An image must be created that contains the entire region where the two objects could touch. This can be done by taking each object's image, properly scaled for dimensional compatibility and aligned with the relative velocity vector, and merging the image files one pixel at a time to create a new, combined image file. Each tube section is unique in time and can have a different image file to accommodate objects whose attitudes are (or appear to be) changing.

General Method

Figure 12:
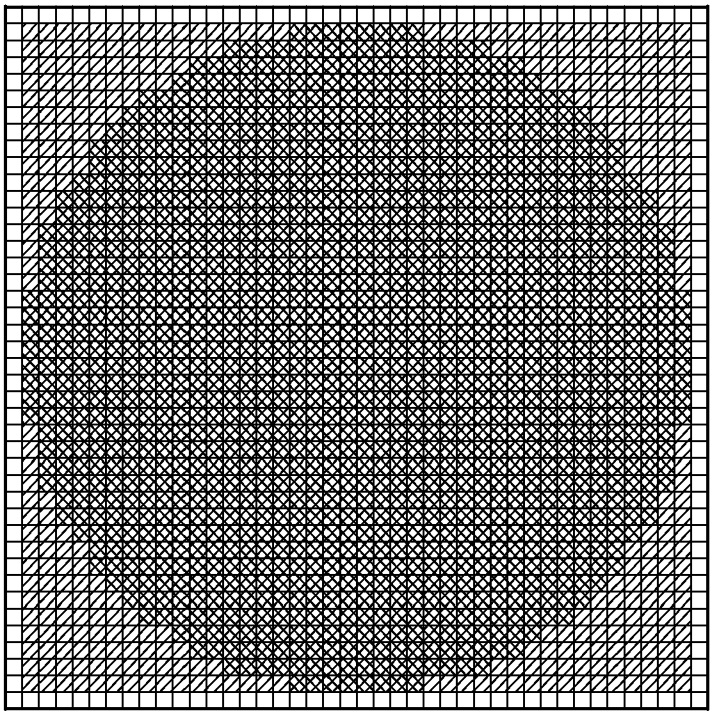
FIG. 12 illustrates parallelepiped faces for a circular cylinder.

Geometric projections determine the end points of each parallelepiped. For a circular cylinder this projection is represented in FIG. 12 where the tube axis is into the page. The dark pixels are those inside the cylinder and are included in the probability calculation. For simple shapes such as circles and squares, determining which pixels to include is quite easy. For more complex shapes a raster sweep method can be employed to assess which pixels are to be included.

Each object image is rendered as a black and white bitmap where pixel resolution determines the number of parallelepipeds. The optical (principal) axis is along the relative velocity vector and the resulting image aligned with the projected, combined, covariance ellipse axes so that the associated encounter plane dimensions are decoupled. Care must be taken to ensure pixel size corresponds to the same distance for both objects.

Figure 13:
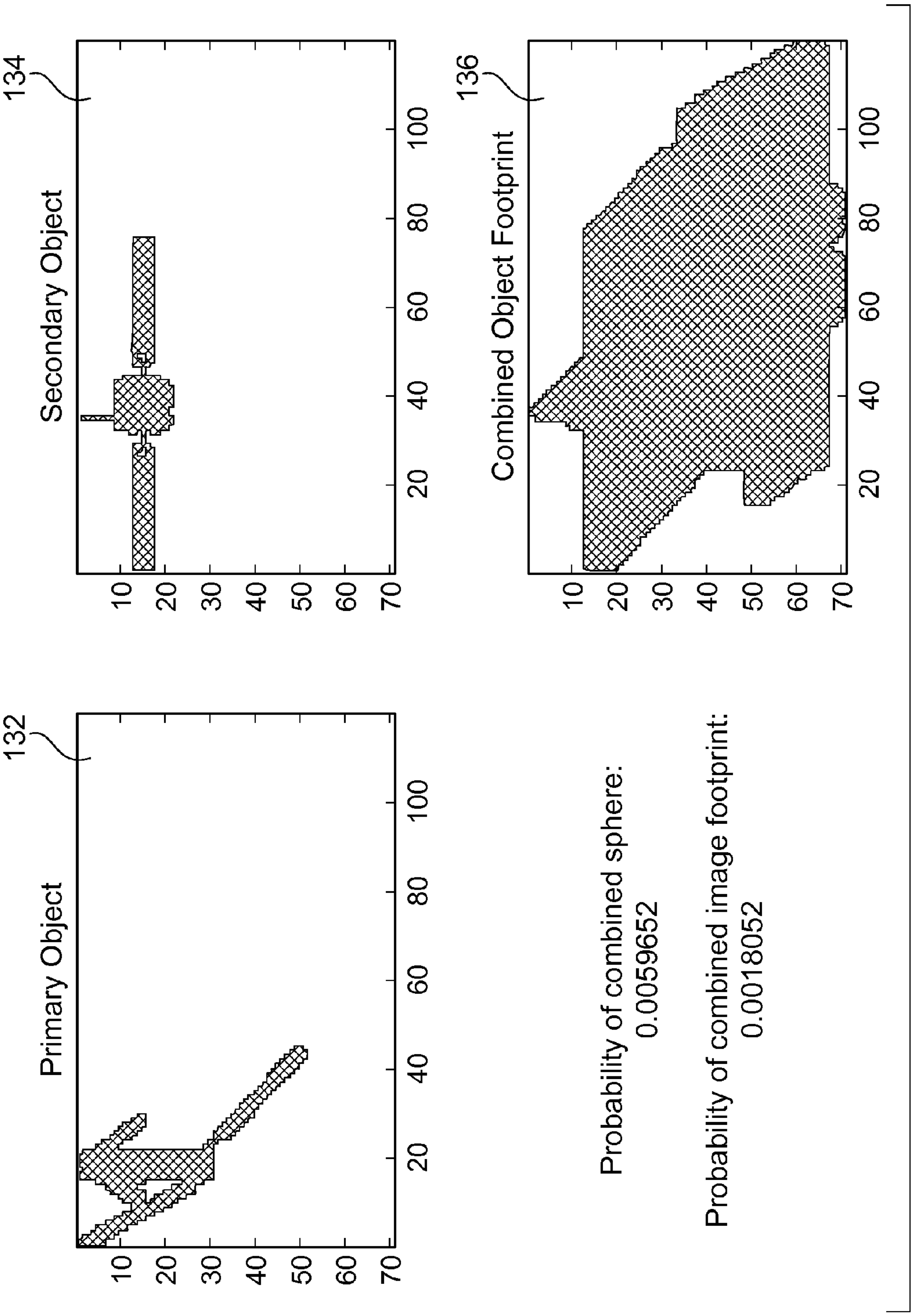
FIG. 13 illustrates a determination of a combined object footprint.

Assuming that the primary object 132 is at the combined covariance ellipsoid center, the secondary object 134 is held fixed and the primary object 132 is moved about the secondary object 134 to determine all points of contact to create a combined object footprint 136. An example of these objects 132, 134 and the resulting footprint 136 are illustrated in FIG. 13.

Combined Object Footprint Computation

The following algorithm assumes that each object image is available and properly scaled and oriented as described above. The image files are produced by the STK© Area Tool and read into MATLAB© using the "imread" intrinsic function. Each image's RGB file is then converted to a binary matrix file where a 1 means the pixel is full (contains the hardbody) and 0 means empty. The number of rows and columns of first object matrix (obj__1) are determined and assigned to i1max and j1max respectively. The number of rows and columns of second object matrix (obj__2) are determined and assigned to i2max and j2max. The combined object matrix (obj_c) is computed as follows:

```
Compute the combined number of rows and columns
    icmax = i1max + i2max −1
    jcmax = j1max + j2max −1
Sweep through the object arrays and assign pixel values for combined
object
    do for ic=1 to icmax
        do for jc=1 to jcmax
            pxl=0
            do for i1=max(ic,i2max) to min(icmax,ic+i2max−1)
                if (pxl > 0) exit i1loop
                do for j1=max(jc,j2max) to min(jcmax,jc+j2max−1)
                    if      (obj__1(i1−i2max+1,j1−j2max+1)+
obj__2(i1− ic+1,j1−jc+1) > 1)
                        pxl=1, exit j1loop
```

-continued

```
                end j1 do loop
            end i1 do loop
            obj__c(ic,jc)=pxl
        end jc do loop
    end ic do loop
```

Practical Considerations

Order is important in determining the object footprint. If the user chooses to reverse the order and put the secondary object at the combined covariance ellipsoid center, the primary is held fixed and the secondary object is moved about the primary to determine all points of contact. This reversal will produce a combined image that is identical to the original but rotated 180°. When projected onto the encounter plane, its center will be also be displaced 180° relative to the combined covariance axes of the original. By symmetry the probability calculation will produce identical results.

Image resolution is also important. The more pixels used to define the objects, the finer the granularity and the more discriminating the probability calculation. More pixels result in longer processing time. The user must determine what resolution will provide the desired accuracy while considering possible time constraints for processing.

By working at the pixel level the objects need not be reduced to primitive shapes such as rectangles, circles, and triangles and then reassembled. The objects can have any combination of concave or convex shapes, sharp corners, spirals, and even gaping holes. By assessing probability pixel by pixel, only the limits of integration change, never the integrand. Equation 8 is all that is needed for the subsequent computations.

Numerical Testing

Initial testing of the combined object footprint was done in a very primitive fashion by cutting out paper images with scissors and tracing out the combined image by hand. Once satisfied that the general shape was correct, a pixel by pixel comparison was done with MATLAB© to ensure nothing was included that should not have been included or omitted that should not have been omitted.

Treating the objects as spheres can greatly over inflate the probability. As seen in the text box of FIG. 13, the combined object footprint 136 produced a probability of 0.0018052. If a circle is placed around each object, the resulting combined circular footprint (not shown) yields a probability of 0.0059652. This is more than three times the exact footprint because the circles contain empty space. In testing many different object shapes and orientations, circular footprints usually occupied three to four times the number of pixels than the exact representation.

Testing was done using several features in Satellite Tool Kit (STK© from Analytical Graphics, Inc. of Exton, Pa.). Satellites are created in STK's object browser. The 3d Graphics Option in the Properties section allows the user to select a Model File (3D representation) from hundreds of different models. The Advanced Close Approach Tool (AdvCAT) propagates all data and finds the point of closest approach between two satellites. The Vector Geometry tool allows the user to define the relative velocity vector at this point. The Area Tool then creates a black and white silhouette of the selected object models using this vector as the optical axis (into the screen). The displayed image can be sized at the discretion of the user and the resulting bitmap exported.

A MATLAB© script imports the position, velocity, and covariance matrix from STK/AdvCAT for each object along with the image files produce by the Area Tool. The script performs a raster sweep to create the combined object footprint, displaces the footprint by the relative position, and then uses the combined covariance data to determine the probability. FIG. 13 is a representation of a partial screen shot of the MATLAB© Graphical User Interface that shows the two object images at the top and the combined image footprint at the bottom, all to the same scale.

System

In use, the instructions for performing the method are embodied in software instructions operating on a personal computer, workstation, or server accessed by a client over a network. The software is stored in memory and the instructions operated on by a processor. The resulting collision probability is displayed to a user via a visual display or a printer. Object information, including position, velocity, and covariance data for the objects can be obtained from a database, determined by a separate propagator software module, or manually input by an operator. Indeed, typical data sources for the object track data include, but are not limited to, Vector Covariance messages from the Air Force Space Command (AFSPC), object owner-operator (e.g., Intelsat, Inmarsat, EchoStar, SES—i.e., Astra. New Skies, and Americom-, NOAA, and Star One) ephemerides which the Center for Space Standards & Innovation (SCCI) is currently providing as part of the SOCRATES-GEO effort, the Orbital Determination Tool Kit (ODTK, available from Analytical Graphics, Inc. of Exton, Pa.) generated ephemerides, and covariances derived from owner-operator observational and/or telemetry data.

Upon performing the calculations, post-processing activity includes, but is not limited to, visualization on a display, generation of graphs and reports, issuance of automated alerts and warnings, and collision avoidance maneuver planning, such as provided by CSSI's collision avoidance maneuver planning tool and/or STK's Astrogator module.

Figure 14:
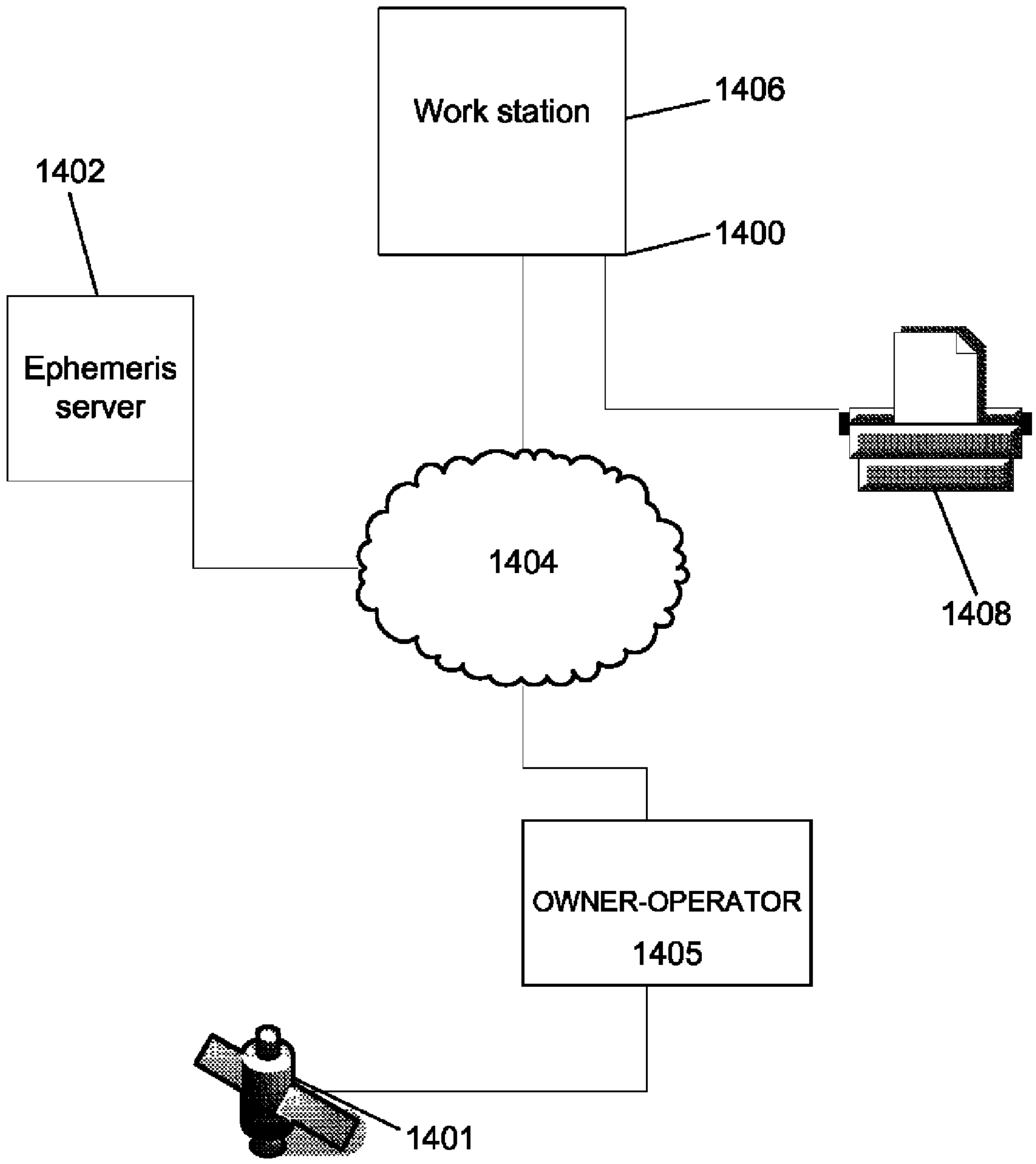
FIG. 14 illustrates an embodiment.

An embodiment for addressing nonlinear relative motion for collision probability using parallelepipeds is illustrated in FIG. 14. Ephemeris data or ephemerides for primary and secondary objects are collected (typically from object owner-operators 1405) and stored at least one ephemerides server 1402. A personal computer or workstation 1400 (hereinafter, workstation) has software instructions stored in memory to operate a processor to perform the method steps. In response to a query from the workstation 1400, the ephemerides server 1402 sends the position, velocity, and covariance data required by the method to the workstation 1400 over a connection or network 1404. The network may be the internet or other wired or wireless communications systems known in the art. The workstation 1400 can display a graphical representation of the collision modeling and the collision probability on a display 1406 or on a printer 1408. The workstation 1400 can also send an automated alert over network 1404 to an appropriate authority, such as to object owner-operators 1405.

Figure 15:
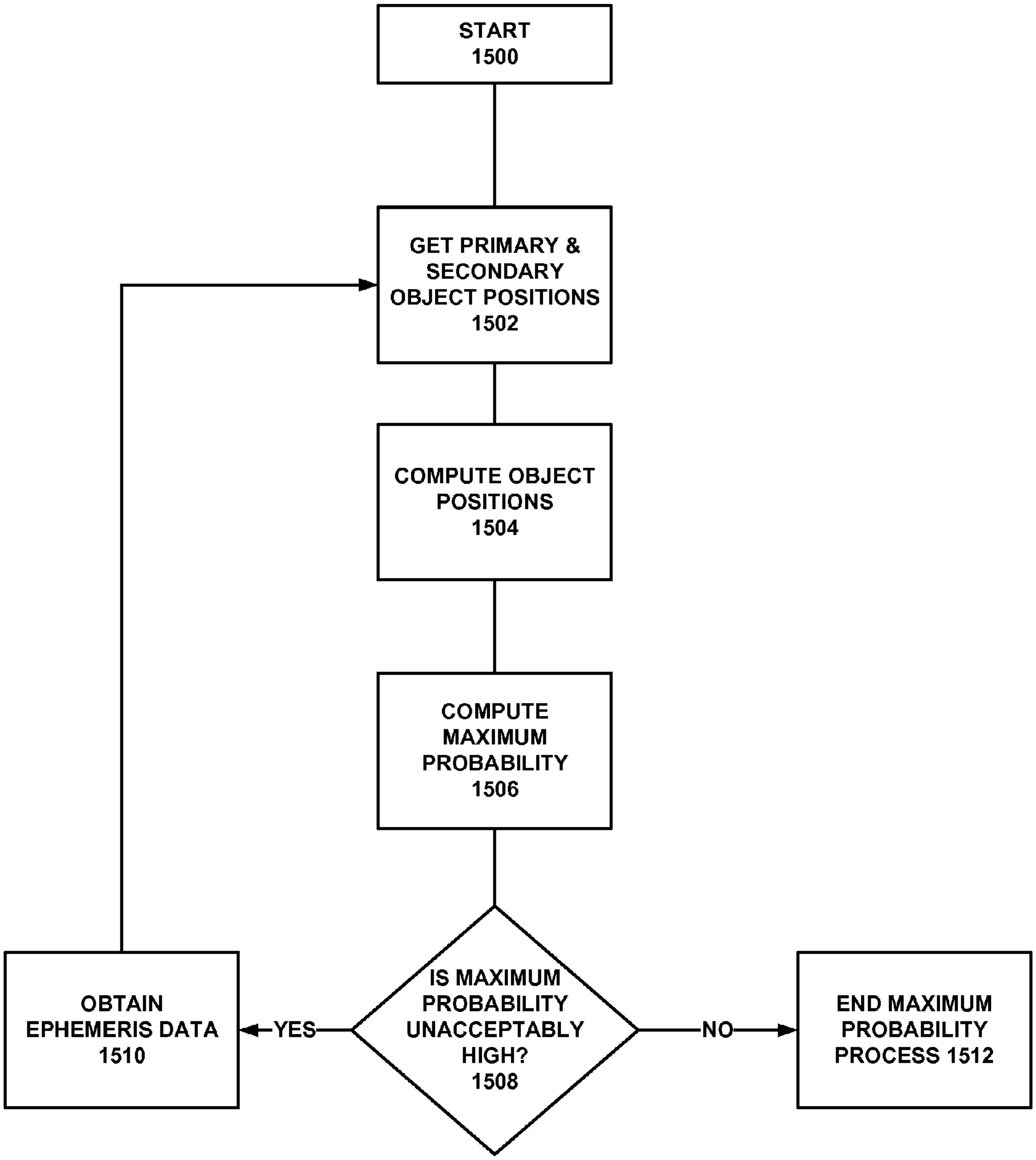
FIG. 15 illustrates the process of taking action in the event of unacceptably high risk.

Referring now to FIG. 15, the process of taking action in the event of unacceptably high risk is illustrated. The analysis process is begun 1500. Primary and secondary object positions are obtained 1502. The relative object positions for various points in time are determined 1504. Based on these data, the risk of collisions calculated 1506. The system next determines if the risk is unacceptably high 1508 based upon rules for risks which are customized to each owner operator. For example, a 1:1,000,000 risk may be acceptable, however, when the risk reaches 1:100,000 action may be triggered such as obtaining more specific ephemeris data directly from the owner-operator, or advising the second owner-operator of the potential danger with a warning to take action. Additional ephemeris data may then be obtained 1510 from the secondary owner-operator and risk calculations can be re-run together with determination of an updated risk analysis. If the risk is not unacceptably high, the owner operator ends the analysis 1512.

Figure 16:
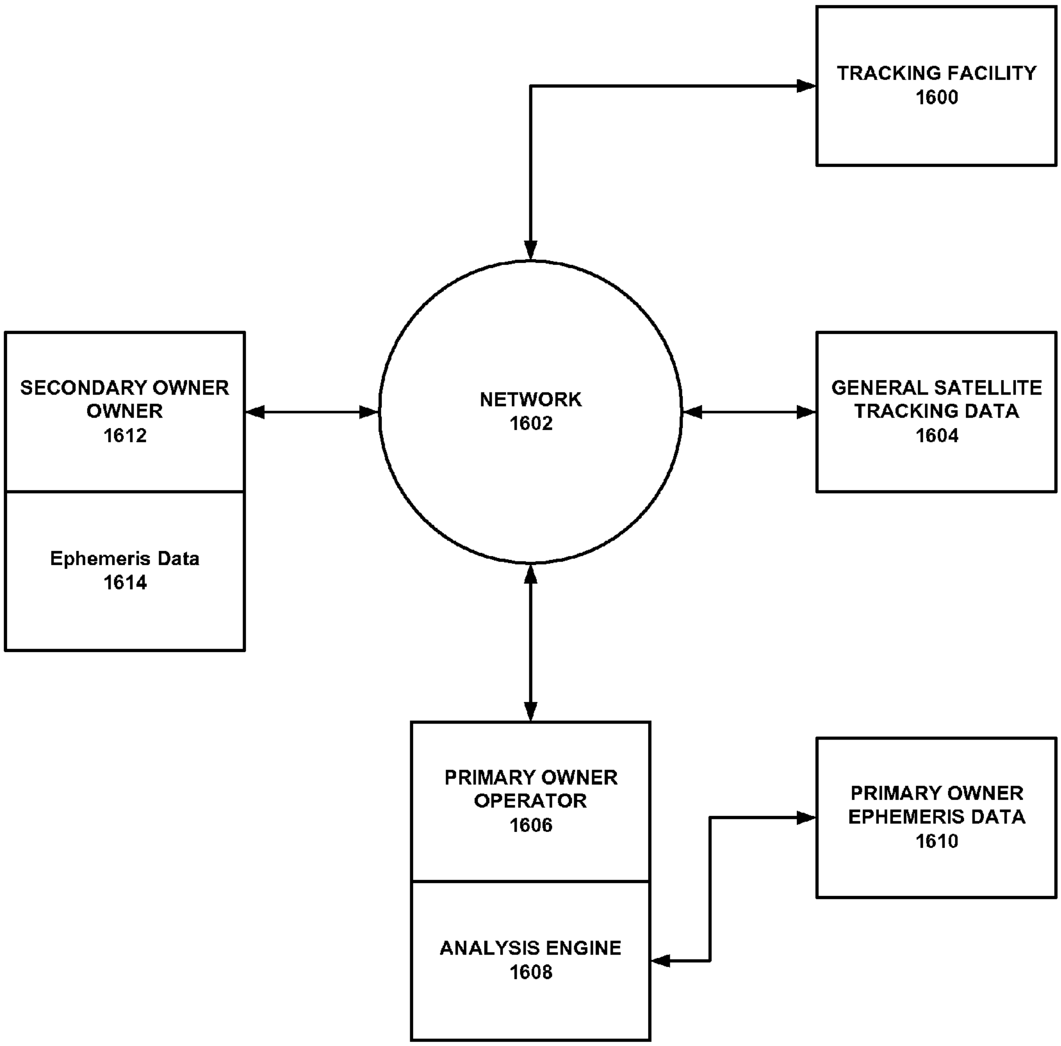
FIG. 16 illustrates another embodiment of the system for avoiding collisions.

Referring now to FIG. 16, another embodiment of the systems for avoiding collisions is illustrated. In this instance, a general tracking facility 1600, such as those run by the US government tracks objects in space. This object tracking data is transmitted over a network 1602 to a positional data database 1604 which is accessible to individual satellite owner-operators 1606. Using this data, an owner-operator 1606 can make an initial determination by running a risk analysis model 1608 using the tracking data from the tracking database 1606 and the owner-operator's own ephemeris data 1610. The results from the initial risk analysis model may show a risk that is unacceptably high. However, the tracking data for the general tracking database may not be the most accurate data available. In that case, the owner-operator can communicate with secondary owner operator 1612 to obtain more specific ephemeris data 1614 against which to run the analysis model.

Figure 17:
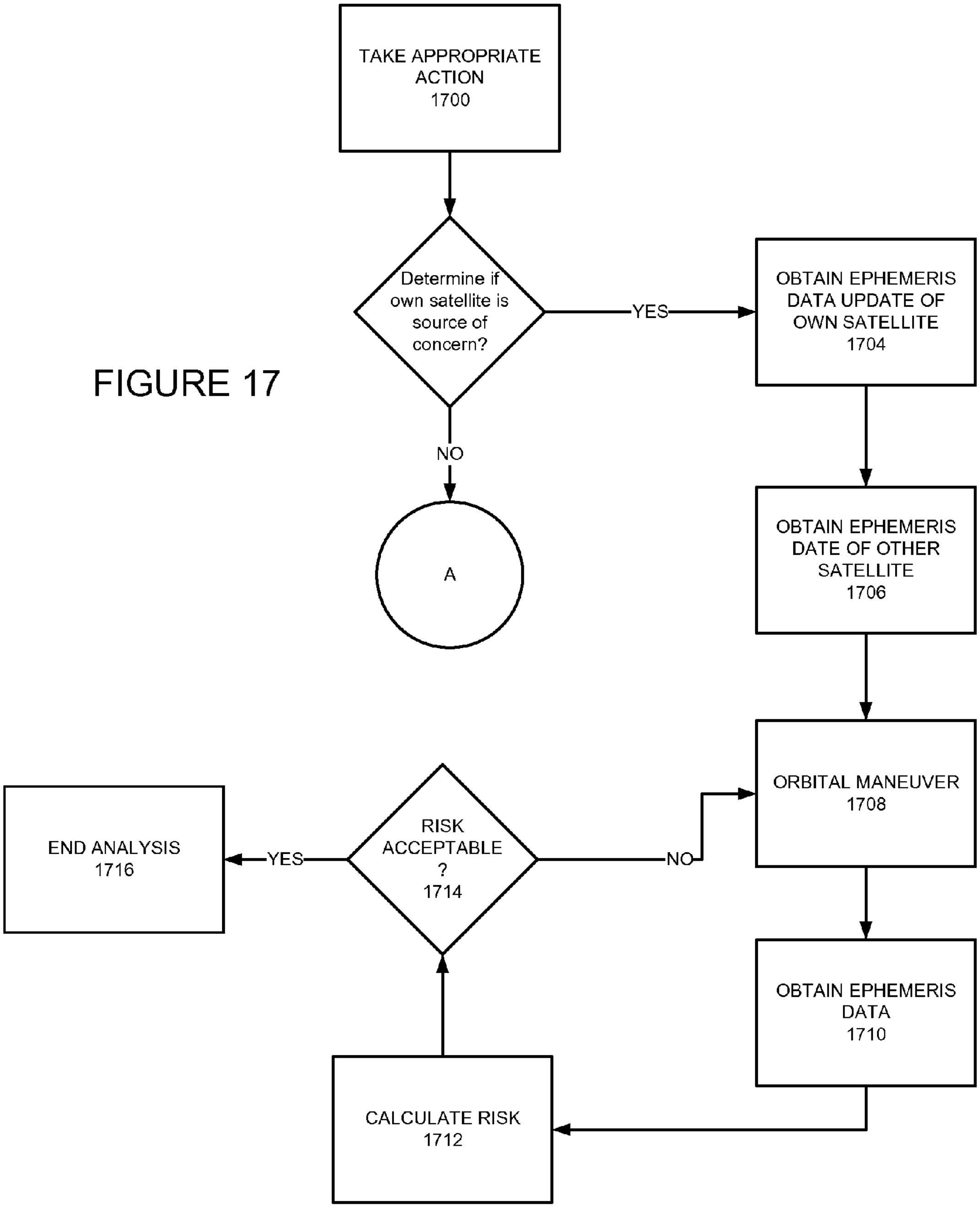
FIG. 17 Illustrates another method embodiment.

Referring now to FIG. 17, an embodiment of the method is illustrated. In this case a risk assessment indicated that action must be taken to avoid a collision 1700. A further analysis must be made to determine which satellite is the cause of concern 1702. For example, it may well be that the primary satellite owner's own satellite is off-course. If this is the case, undated ephemeris data for the primary satellite is obtained 1704 and better ephemeris data is obtained for the secondary satellite 1706. An orbital maneuver is then accomplished 1708. Further ephemeris data is then obtained for the primary satellite and secondary satellite 1710. The risk analysis model 1712 is then run to determine if the resulting post-maneuver risk is acceptable 1714. If the risk is still too high, another maneuver can be accomplished 1708 and the process repeated until the risk is acceptable 1714. At that point the analysis ends.

Figure 18:
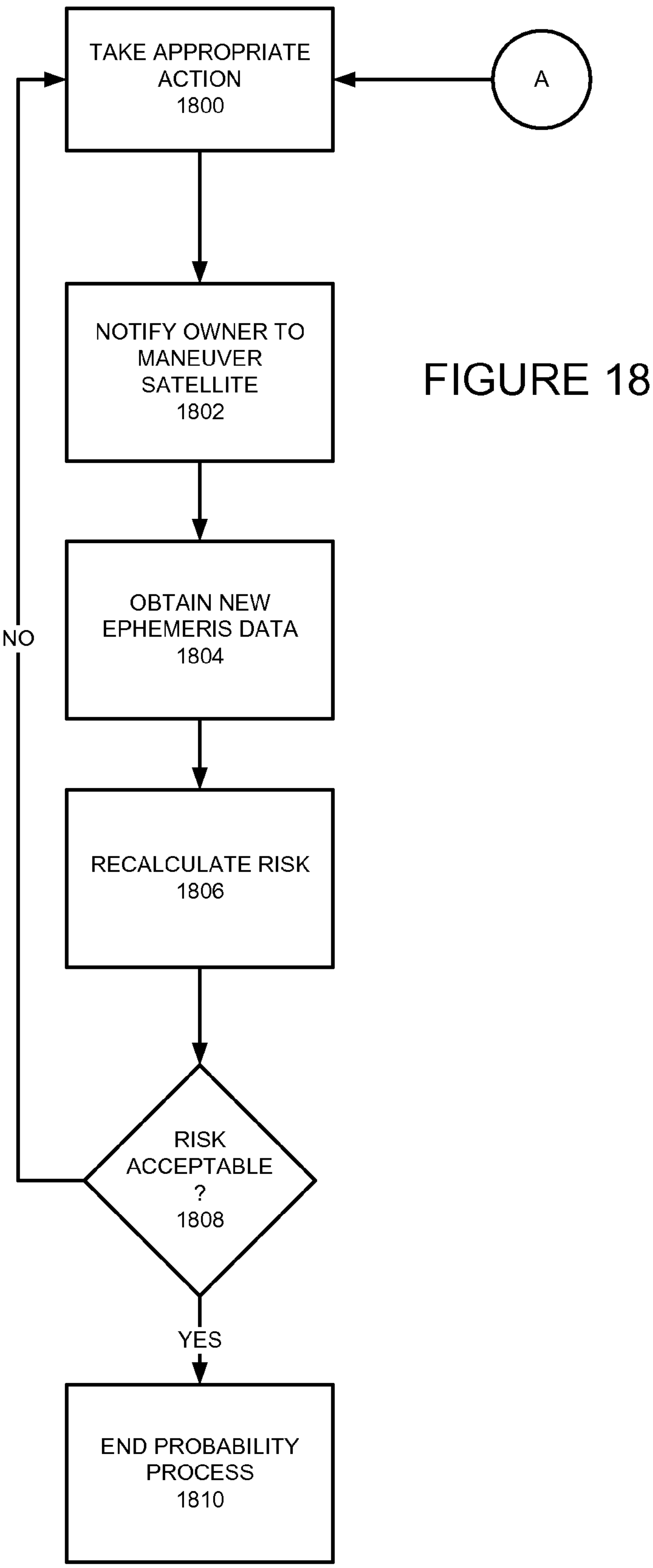
FIG. 18 illustrates the situation where the problem of the potential collision is not caused by the primary satellite owner.

Referring now to FIG. 18, the situation where the problem of the potential collision is not caused by the primary satellite owner. In this instance, the appropriate action 1800 to be taken is to notify the secondary satellite owner to effect a maneuver 1802 that will avoid the potential for a collision. After action is taken, new ephemeris data can be obtained 1804 from the primary and secondary satellite owners 1806 and the risk assessment run again to determine if the risk is acceptable 1808. If not, the secondary satellite owner is notified of the continuing need for a satellite maneuver and the process is repeated. If the risk, based upon analysis of the primary and secondary satellite ephemeris data is acceptable 1808, the probability assessment is ended 1810.

It is important to note that while the potential for collision may not be caused by a primary owner operator, it may still be the responsibility of the primary owner-operator to avoid the collision. For example, On Jul. 14, 2008, DISH Network's EchoStar 2 satellite experienced a substantial failure that rendered the satellite a total loss. It is now drifting through the geosynchronous orbit belt and is a definite hazard to other satellites. Various embodiments illustrated herein allow automatic risk assessment to other satellites automatically. Since EchoStar 2 can no longer respond to commands, if a conjunction is ever predicted the responsibility to maneuver will be upon the other owner/operator.

As noted above, the risk assessment can also be run in an automated fashion without human intervention. For example, it is generally well known which satellites are in the same general area as the primary satellite owner's. In those cases, tracking data from government facilities can automatically be obtained and updated on a periodic basis as a time driven data retrieval query. That information can then be analyzed against the ephemeris data of the primary satellite owner. Based on rules stored in the database of the primary satellite owner, (i.e. when is risk unacceptable), correction action can be triggered in the form of alarms to the primary satellite owner at the respective command center, and/or messages being generates and sent to the secondary satellite owner/command center that a potential problem exists. In this fashion, potential problems become immediately known to the respective parties.

A system and method of addressing nonlinear relative motion for collision probability using parallelepipeds has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A method of avoiding a collision of objects in flight comprising:

receiving at a workstation primary and secondary object data from a database or from user input, wherein the workstation comprises a processor;

modeling by the processor a non-linear collision tube volume for the primary and secondary object as a plurality of linear collision tube volumes having mitered abutting ends;

calculating by the processor the collision probability for each mitered linear collision tube by using a bundle of parallelepipeds to approximate the mitered linear collision tube volume; and issuing an alert from the processor when the collision probability exceeds a threshold value.

2. The method of claim 1, wherein the 2-dimensional collision probability $P_{2d}$ for each parallelepiped is calculated by the processor by aligning the parallelepiped sides with the projected covariance axes and multiplying $P_{1d}$ of each axis to produce $P_{2d}$, where $P_{1d}$ for each parallelepiped is computed in Mahalanobis space as:

$$P_{1d} = \left|\frac{1}{2}\cdot\left(\operatorname{erf}\left(\frac{M_f}{\sqrt{2}}\right) - \operatorname{erf}\left(\frac{M_i}{\sqrt{2}}\right)\right)\right|$$

and the overall collision probability for the parallelepiped is $P_{2d}$ of the parallelepiped face multiplied by $P_{1d}$ of the parallelepiped long axis.

3. The method of claim 1, further comprising the bundle of parallelepipeds having end faces approximating a combined object footprint for each linear collision tube.

4. The method of claim 3, wherein the combined object footprint is determined using a raster sweep of the primary object in scaled pixels as viewed in an axis of a relative velocity vector over the secondary object in scaled pixels as viewed in the axis of the relative velocity vector to determine all points of contact so as to define the combined object footprint.

5. The method of claim 4, wherein pixels of the combined object footprint are used as the end faces of the parallelepipeds.

6. The method of claim 1, wherein geometric projections are used to determine the end points of each parallelepiped by:

letting r1, r2, and r3 be three consecutive points along a relative trajectory of a primary object and a secondary object in the Velocity-Normal-Co-Normal (VNC) frame of the primary object;

determining by the processor the unit vectors from r1 to r2 as axis12 for a first tube and from r2 to r3 as axis23 for the second tube;

rotating by the processor the axes to a new frame denoted by suffix r where the z component is aligned with axis12 such that after rotation axis12*r* is position (0 0 1);

defining axis13*r* as the sum of axis12*r* and axis23*r*, wherein a compound miter between tubes is perpendicular to axis13*r* and passes through r2*r*;

determining by the processor the r2*r* end point adjustment dz in the new frame for each parallelepiped by examining the first tube's off-axis positions dx and dy through the equation $$dz = \frac{dx\cdot axis13r_x + dy\cdot axis13r_y}{-axis13r_z};$$

and shifting by the processor a center of the parallelepiped's face from r2*r* by (dx dy dz), placing it on the surface of the compound miter between the tubes.

7. The method of claim 1, further comprising post-calculation activity selected from the group consisting of visualization on a display, generation of graphs and reports, and collision avoidance maneuver planning.

8. The method of claim 1, wherein the objects in flight are selected from the group consisting of an aircraft, a spacecraft, and a ballistic projectile.

9. A method of avoiding a collision of objects in flight comprising:

receiving at a workstation primary and secondary object data from a database or from user input, wherein the workstation comprises a processor;

defining an encounter region between a primary object and a secondary object as an n-σ shell ellipsoid centered on the primary object;

determining by a processor object position, velocity, and associated covariances at a time of closest approach;

propagating by the processor object position, velocity, and associated covariances forward and backward in time until a user-defined limit is reached;

modeling by the processor a non-linear collision tube volume along the propagated relative trajectory as a plurality of linear collision tube volumes having mitered abutting ends; and calculating by the processor the collision probability for each mitered linear collision tube by using a bundle of parallelepipeds to approximate the mitered linear collision tube volume, wherein the 2-dimensional collision probability $P_{2d}$ for each parallelepiped is calculated by aligning the parallelepiped sides with the projected covariance axes and multiplying $P_{1d}$ of each axis to produce $P_{2d}$, where $P_{1d}$ for each parallelepiped is computed in Mahalanobis space as:

$$P_{1d} = \left|\frac{1}{2}\cdot\left(\mathrm{erf}\left(\frac{M_f}{\sqrt{2}}\right) - \mathrm{erf}\left(\frac{M_i}{\sqrt{2}}\right)\right)\right|$$

and the overall collision probability for the parallelepiped is $P_{2d}$ of the parallelepiped face multiplied by $P_{1d}$ of the parallelepiped long axis; and issuing an alert when the collision probability exceeds a threshold value.

10. The method of claim 9, wherein geometric projections are used to determine the end points of each parallelepiped by:

letting r1, r2, and r3 be three consecutive points along the relative trajectory in the Velocity-Normal-Co-Normal (VNC) frame of the primary object;

determining by the processor the unit vectors from r1 to r2 as axis12 for a first tube and from r2 to r3 as axis23 for the second tube;

rotating by the processor the axes to a new frame denoted by suffix r where the z component is aligned with axis12 such that after rotation axis12*r* is position (0 0 1);

defining axis13*r* as the sum of axis12*r* and axis23*r*, wherein a compound miter between tubes is perpendicular to axis13*r* and passes through r2*r*;

determining by the processor the r2*r* end point adjustment dz in the new frame for each parallelepiped by examining the first tube's off-axis positions dx and dy through the equation $$dz = \frac{dx \cdot axis13r_x + dy \cdot axis13r_y}{-axis13r_z};$$

and shifting by the processor a center of the parallelepiped's face from r2*r* by (dx dy dz), placing it on the surface of the compound miter between the tubes.

11. The method of claim 9, wherein the user-defined limit is between 3σ and 8.5σ.

12. The method of claim 9, wherein the user-defined limit is ½ an orbital period.

13. The method of claim 9, further comprising the bundle of parallelepipeds having end faces approximating a combined object footprint for each linear collision tube.

14. The method of claim 13, wherein the combined object footprint is determined using a raster sweep of the primary object in scaled pixels as viewed in an axis of the relative velocity vector over the secondary object in scaled pixels as viewed in the axis of the relative velocity vector to determine all points of contact so as to define the combined object footprint.

15. The method of claim 14, wherein pixels of the combined object footprint are used as the end faces of the parallelepipeds.

16. The method of claim 9, further comprising determining by the processor object position, velocity, and associated covariances at a time of closest approach by accessing the information from a database.

17. The method of claim 9, further comprising post-calculation activity selected from the group consisting of visualization on a display, generation of graphs and reports, and collision avoidance maneuver planning.

18. The method of claim 9, wherein the objects in flight are selected from the group consisting of an aircraft, a spacecraft, and a ballistic projectile.

19. A method of avoiding a collision of objects in flight comprising:

receiving at a workstation primary and secondary object data from a database or from user input, wherein the workstation comprises a processor;

modeling by the processor using the primary and secondary object data a non-linear collision tube volume as a plurality of linear collision tube volumes having mitered abutting ends;

modeling by the processor using the primary and secondary object data the collision probability for each mitered linear collision tube by using a bundle of parallelepipeds to approximate the mitered linear collision tube volume;

determining by the processor using the primary and secondary object data a combined object footprint using a raster sweep of the primary object in scaled pixels as viewed in an axis of a relative velocity vector over the secondary object in scaled pixels as viewed in the axis of the relative velocity vector to determine all points of contact so as to define the combined object footprint; and calculating by the processor collision probability for the parallelepipeds in Mahalanobis space in accordance with the following algorithm:

Initially propagate all to Time of Closest Approach (TCA) in Earth Centered Inertial (ECI) frame Convert starting data to Velocity-Normal-Co-Normal (VNC) frame of primary object Assign original relative position in VNC frame to r2

Determine relative position r1_ECI & covariance by propagating back one time step from TCA Convert propagated data to VNC frame of primary object Assign relative position in VNC frame to r1

Determine relative position r3_ECI & covariance by propagating forward one time step from TCA Convert propagated data to VNC frame of primary object Assign relative position in VNC frame to r3

Begin iteration

Propagate forward one time step from r3_ECI to determine relative position r4_ECI & covariance Convert propagated data to VNC frame of primary object Assign relative position in VNC frame to r4

Create unit vector from r1 to r2, label it axis12

Create unit vector from r2 to r3, label it axis23

Create unit vector from r3 to r4, label it axis34

Create vector from summation of axis12 and axis 23, label it axis13

Create vector from summation of axis23 and axis 34, label it axis24

Compute necessary rotation matrix to align new z component with relative velocity (axis23) while simultaneously decoupling new x and y components with respect to projected covariance Rotate r2, r3, axis23, axis13, axis24, and 3×3 positional covariance (C3) associated with r2 to new frame while denoting rotated data with an r suffix (r2*r*, r3*r*, axis23*r*, axis13*r*, axis24*r*, C3*r*

Compute necessary rotation/scaling matrix to go from new frame to Mahalanobis space where the z component is aligned with the relative velocity vector, label it T_maha Middle tube axis endpoints are r2*r* and r3*r*: [xm, ym, zm2] =r2*r* & [xm, ym, zm3]=r3*r*

Find z component of tube's central axis ends using T_maha transformation, label them zm_start & zm_end For each pixel of combined object Determine its width, height, and off-axis central position (dx, dy)

Use r2$r$, axis13$r$, dx and dy to find dz2 to define one end of parallelepiped [xm+dx, ym+dy, zm2−dz2]

Find z component of parallelepiped end using T_maha transformation, label it z_start Use r3$r$, axis24$r$, dx and dy to find dz3 to define other end of parallepiped [xm+dx, ym+dy, zm3−dz3]

Find z component of parallelepiped end using T_maha transformation, label it z_end Find parallelepiped's 2D probability (face) centered at [xm+dx, ym+dy] using corresponding width and height Find parallelepiped's 1D probability (length) using z_start and z_end If sign(zm_end−zm_start) is opposite of sign(z_end−z_start) then there is overlap Negate parallelepiped's 1D probability Multiply 1D and 2D probabilities and add to running sum Reassign r2 to r1, r3 to r2, r4 to r3; do likewise for covariances Repeat until final limit reached repeating by the processor the iteration of the algorithm in a second direction; and adding by the processor the calculated probabilities together to find a collision probability of the primary and secondary objects; and issuing an alert when the overall collision probability exceeds a threshold value.

20. The method of claim 19, wherein the 2D probability of the face (2-dimensional collision probability $P_{2d}$) for each parallelepiped is calculated by the processor by aligning the parallelepiped sides with the projected covariance axes and multiplying 1D probability ($P_{1d}$) of each axis to produce the 2D probability of the face, where 1D probability ($P_{1d}$) for each parallelepiped is computed in Mahalanobis space as:

$$P_{1d} = \left|\frac{1}{2}\cdot\left(\operatorname{erf}\left(\frac{M_f}{\sqrt{2}}\right) - \operatorname{erf}\left(\frac{M_i}{\sqrt{2}}\right)\right)\right|.$$

21. The method of claim 19, wherein the user-defined limit is between 3σ and 8.5σ.

22. The method of claim 19, wherein the user-defined limit is ½ an orbital period.

23. The method of claim 19, wherein the primary and secondary object data comprise object position, velocity, and associated covariances at a time of closest approach.

24. The method of claim 19, further comprising post-calculation activity selected from the group consisting of visualization on a display, generation of graphs and reports, and collision avoidance maneuver planning.

25. The method of claim 19, wherein the objects in flight are selected from the group consisting of an aircraft, a spacecraft, and a ballistic projectile.

26. A system for avoiding a collision of objects in flight, comprising:

an ephemerides server attached to a network, the ephemerides server further comprising a database for storage of position, velocity and covariance data for a primary object and a secondary object;

a computer attached to the network, the computer comprising a processor for executing instructions and a memory comprising software instructions for:

requesting and receiving primary and secondary object data from the ephemerides server;

modeling a non-linear collision tube volume for the primary and secondary object as a plurality of linear collision tube volumes having mitered abutting ends; and calculating the collision probability for each mitered linear collision tube by using a bundle of parallelepipeds to approximate the mitered linear collision tube volume; and issuing an alert when the overall collision probability exceeds a threshold value.

27. The system of claim 26, wherein the 2-dimensional collision probability $P_{2d}$ for each parallelepiped is calculated by instructions for aligning the parallelepiped sides with the projected covariance axes and multiplying $P_{1d}$ of each axis to produce $P_{2d}$, where $P_{1d}$ for each parallelepiped is computed in Mahalanobis space as:

$$P_{1d} = \left|\frac{1}{2}\cdot\left(\operatorname{erf}\left(\frac{M_f}{\sqrt{2}}\right) - \operatorname{erf}\left(\frac{M_i}{\sqrt{2}}\right)\right)\right|$$

and the overall collision probability for the parallelepiped is $P_{2d}$ of the parallelepiped face multiplied by $P_{1d}$ of the parallelepiped long axis.

28. The system of claim 27, further comprising instructions for defining the bundle of parallelepiped end faces as a combined object footprint for each linear collision tube.

29. The system of claim 28, further comprising instruction for determining the combined object footprint with a raster sweep of the primary object in scaled pixels as viewed in an axis of a relative velocity vector over the secondary object in scaled pixels as viewed in the axis of the relative velocity vector to determine all points of contact so as to define the combined object footprint.

30. The system of claim 26, further comprising an output means connected to the computer workstation selected from the group consisting of a display, a printer, an alarm, and a collision avoidance maneuver planning tool.

31. The system of claim 26, further comprising instructions for determining the end points of each parallelepiped using geometric projections by:

letting r1, r2, and r3 be three consecutive points along a relative trajectory of a primary object and a secondary object in the Velocity-Normal-Co-Normal (VNC) frame of the primary object;

determining the unit vectors from r1 to r2 as axis12 for a first tube and from r2 to r3 as axis23 for the second tube;

rotating the axes to a new frame denoted by suffix r where the z component is aligned with axis12 such that after rotation axis12$r$ is position (0 0 1);

defining axis13$r$ as the sum of axis12$r$ and axis23$r$, wherein a compound miter between tubes is perpendicular to axis13$r$ and passes through r2$r$;

determining the r2$r$ end point adjustment dz in the new frame for each parallelepiped by examining the first tube's off-axis positions dx and dy through the equation $$dz = \frac{dx\cdot axis13r_x + dy\cdot axis13r_y}{-axis13r_z};$$

and shifting a center of the parallelepiped's face from r2$r$ by (dx dy dz), placing it on the surface of the compound miter between the tubes.

* * * * *